(12) United States Patent
Hu et al.

(10) Patent No.: US 11,694,009 B2
(45) Date of Patent: *Jul. 4, 2023

(54) PATTERN CENTRIC PROCESS CONTROL

(71) Applicant: Anchor Semiconductor Inc., Santa Clara, CA (US)

(72) Inventors: Chenmin Hu, Saratoga, CA (US); Khurram Zafar, San Jose, CA (US); Ye Chen, San Jose, CA (US); Yue Ma, San Jose, CA (US); Rong Lv, Shanghai (CN); Justin Chen, Milpitas, CA (US); Abhishek Vikram, Santa Clara, CA (US); Yuan Xu, Sunnyvale, CA (US); Ping Zhang, Saratoga, CA (US)

(73) Assignee: Anchor Semiconductor, Inc., Santa Clara, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/222,132

(22) Filed: Apr. 5, 2021

(65) Prior Publication Data

US 2021/0326505 A1 Oct. 21, 2021

Related U.S. Application Data

(63) Continuation of application No. 16/696,554, filed on Nov. 26, 2019, now Pat. No. 10,997,340, which is a (Continued)

(51) Int. Cl.
*G06F 30/3323* (2020.01)
*G06F 119/18* (2020.01)
(Continued)

(52) U.S. Cl.
CPC .......... *G06F 30/3323* (2020.01); *G03F 7/705* (2013.01); *G03F 7/70433* (2013.01);
(Continued)

(58) Field of Classification Search
USPC .......................................... 716/53
See application file for complete search history.

(56) References Cited

U.S. PATENT DOCUMENTS

| 2008/0140330 A1* | 6/2008 | Morioka | G05B 15/02 |
| | | | 702/179 |
| 2010/0131915 A1* | 5/2010 | Hirabayashi | G06F 30/398 |
| | | | 716/50 |

FOREIGN PATENT DOCUMENTS

TW 201512873 A 4/2015

* cited by examiner

*Primary Examiner* — Bryce M Aisaka
(74) *Attorney, Agent, or Firm* — Huse IP Law; Charles C. Huse

(57) ABSTRACT

Pattern centric process control is disclosed. A layout of a semiconductor chip is decomposed into a plurality of intended circuit layout patterns. For the plurality of intended circuit layout patterns, a corresponding plurality of sets of fabrication risk assessments corresponding to respective ones of a plurality of sources is determined. Determining a set of fabrication risk assessments for an intended circuit layout pattern comprises determining fabrication risk assessments based at least in part on: simulation of the intended circuit layout pattern, statistical analysis of the intended circuit layout pattern, and evaluation of empirical data associated with a printed circuit layout pattern. A scoring formula is applied based at least in part on the sets of fabrication risk assessments to obtain a plurality of overall fabrication risk assessments for respective ones of the plurality of intended circuit layout patterns. The plurality of intended circuit layout patterns is ranked based on their fabrication risk assessments, the corresponding overall fabrication risk assessments, or both. At least a portion of ranking information is outputted to facilitate influence or control over the semiconductor fabrication process.

17 Claims, 14 Drawing Sheets

Related U.S. Application Data continuation of application No. 15/944,080, filed on Apr. 3, 2018, now Pat. No. 10,546,085.

(60) Provisional application No. 62/484,801, filed on Apr. 12, 2017.

(51) Int. Cl.
| | | |
|---|---|---|
| *G06N 5/04* | (2023.01) | |
| *G03F 7/00* | (2006.01) | |
| *G06N 20/00* | (2019.01) | |
| *G06F 111/04* | (2020.01) | |
| *G06F 111/20* | (2020.01) | |
| *G06F 111/10* | (2020.01) | |

(52) U.S. Cl.
CPC ...... *G03F 7/70441* (2013.01); *G03F 7/70508* (2013.01); *G06N 5/04* (2013.01); *G06F 2111/04* (2020.01); *G06F 2111/10* (2020.01); *G06F 2111/20* (2020.01); *G06F 2119/18* (2020.01); *G06N 20/00* (2019.01)

| Set of Unique Constituent Patterns (302) | Ranking by Design Signatures (304) | Ranking by OPC Simulation (306) | Ranking by Actual Printed Patterns (308) |
|---|---|---|---|
| Unique Patterns | Sig Score | OPC Score | Wafer Score |
| ☐ | L | M | M |
| ☐ | H | H | H |
| ☐ | H | H | |
| ☐ | L | M | M |
| ☐ | L | M | |
| ☐ | H | L | |
| ☐ | L | L | L |
| ☐ | L | L | M |
| ☐ | H | H | |
| ☐ | H | H | |
| ☐ | M | M | |
| ☐ | M | L | L |
| ☐ | L | L | |
| ☐ | H | H | H |
| ☐ | L | M | |
| | Statistical | Simulation | Empirical |

FIG. 3

PATTERN CENTRIC PROCESS CONTROL

CROSS REFERENCE TO OTHER APPLICATIONS

This application is a continuation of U.S. patent application Ser. No. 16/696,554, entitled PATTERN CENTRIC PROCESS CONTROL filed Nov. 26, 2019 which is incorporated herein by reference for all purposes, which is a continuation of U.S. patent application Ser. No. 15/944,080, entitled PATTERN CENTRIC PROCESS CONTROL filed Apr. 3, 2018, now U.S. Pat. No. 10,546,085, which is incorporated herein by reference for all purposes, which claims priority to U.S. Provisional Application No. 62/484,801, entitled PATTERN CENTRIC PROCESS CONTROL filed Apr. 12, 2017 which is incorporated herein by reference for all purposes.

BACKGROUND OF THE INVENTION

As microchip fabrication continues to use smaller and smaller geometries, the effects of process drift and process variation are greatly enlarged. There is a need for improved process control as printed geometries become smaller.

BRIEF DESCRIPTION OF THE DRAWINGS

Various embodiments of the invention are disclosed in the following detailed description and the accompanying drawings.

FIG. 3 illustrates an example embodiment of a ranking of unique constituent patterns.

DETAILED DESCRIPTION

Figure 1A:
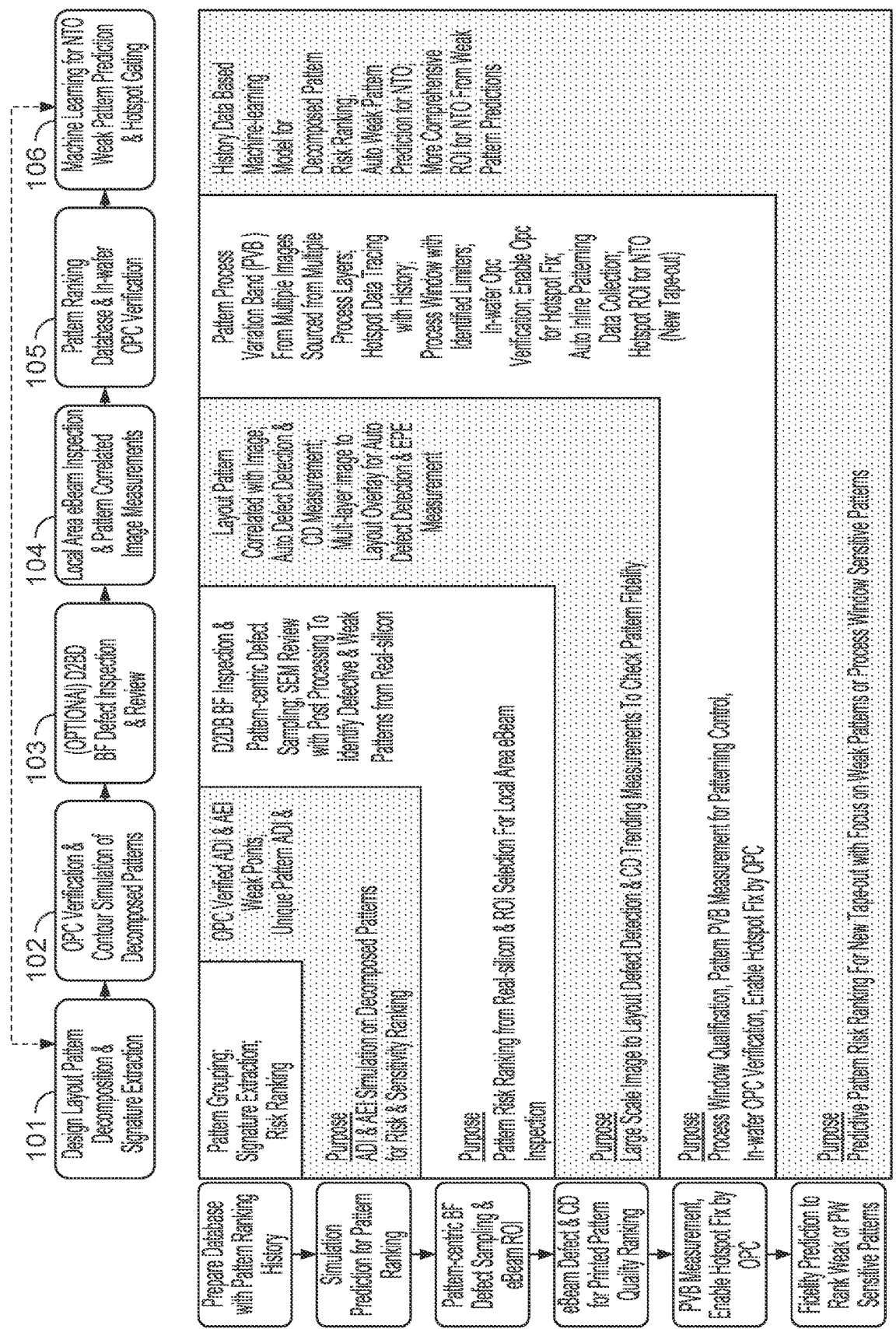
FIG. 1A illustrates an embodiment of an overview of pattern centric process control.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Microchip fabrication may include an intricate series of process and diagnostic steps performed on silicon wafers. A complete fabrication cycle—in which a bare wafer undergoes these process and diagnostic steps and emerges as a fully fabricated wafer with a multitude of patterned die—may take several months. The transistors, interconnects, and other discrete elements that may make up the circuit of the microchip are being manufactured at ever increasingly small geometries. As of 2017, the state-of-the-art is 10 nm (nanometer) line widths and line spaces. Because all physical processes are subject to drift and variances, the need for process control becomes clear. Various process control methods have been applied throughout the history of microchip fabrication, but these methods have typically relied upon special test patterns and/or test wafers. While there have been attempts to perform process control based on actual printed wafers and actual printed patterns (not test wafers or test patterns), these attempts have had limited success.

As microchip fabrication continues to use smaller and smaller geometries—for example, going from 28 nm to 22 nm to 14 nm to 10 nm in just the past few years—the effects of process drift and process variation are greatly enlarged. At 28 nm, for example, a drift that causes a 28 nm space to shrink to 20 nm (a reduction of 8 nm) is more tolerable than a similar drift that causes a 10 nm space to shrink by the same amount and produce a net 2 nm space. Process control, therefore, is increasingly important at smaller printed geometries.

Microchip fabrication is accomplished by transferring the schematic diagram (or physical layout) of the circuit onto the surface of a silicon wafer, where that schematic diagram is printed at extremely small geometric scales. Schematic diagrams (physical layouts) are composed of circuit lines and the spaces between them. When printed onto the wafer surface, the widths of these circuit lines may be only a few nanometers wide (where a nanometer is one-billionth of a meter). The physical layout to be printed is also referred to herein as the "intended pattern" or "reference pattern" or the "design intent." However, due to numerous factors involved in the manufacture of such tiny geometries, the actual printed pattern may differ from the intended pattern. The physical layout file represents the reference or the full intended design. In an ideal world, the actual printed pattern would look exactly like the intended pattern. But the real world is less than ideal, and a large number of problems and challenges facing modern wafer fabs involve discrepancies between the intended and actual printed patterns. For example, the printed circuit layout pattern will rarely look like the intended pattern. These discrepancies may range from the subtle to the significant, and from the random to the systemic. The degree of error or difference between intended and printed circuit layout patterns may degrade the electrical performance of the circuit, may cause actual yield loss, and may incur delays in production of semiconductor devices. It would be beneficial (e.g., for yield enhancement activities) if controlling the manufacturing processes involved in the fabrication of such tiny printed patterns took into account the actual printed patterns in a more comprehensive way (e.g., to better understand and identify the causes for why intended and printed circuit layout patterns do not match up, as well as to fix or otherwise address such causes).

In some embodiments described herein is a technique for process control that is based on product wafers (e.g., non-test wafers including production wafers, R&D wafers, etc.) and product patterns as opposed to, for example, test wafers and test patterns. As such, in some embodiments, the example process control technique described herein monitors real silicon wafers (i.e., product wafers used to produce integrated circuit products) and may benefit from the much larger volume of product wafers and the much larger diversity of patterns printed on those wafers. Test wafers, by contrast, are typically low volume wafers that are produced occasionally and used exclusively for test purposes and not for producing final products. And test patterns, by contrast, typically employ a small diversity of structures and may not cover the broad diversity of patterns used in an intended design of an integrated circuit. In one embodiment, the example process control technique described herein is referred to as "Pattern Centric Process Control" (or PCPC) because of the use of product wafers and product patterns. In some embodiments, Pattern Centric Process Control extends beyond drift and variance monitoring to include hotspot or weak pattern identification and tracking as well. In some embodiments, hotspots and weak patterns are patterns that exhibit a general fabrication weakness due to factors other than drift and variance.

The example Pattern Centric Process Control (PCPC) technique described herein may be broad-based, taking into account such entities and operations, for example, as microchip physical design layout files (e.g., GDS/OASIS), OPC Simulation (Optical Proximity Correction), Wafer Inspection, SEM Review, eBeam Inspection, Die-to-Database (D2DB) Defect Detection and Measurement, Real Silicon Pattern Quality Database, Pattern decomposition and ranking database, In-Wafer OPC Verification, and Machine Learning.

In some embodiments, as a pattern centric approach to process control is described herein, process control begins by decomposing a microchip design or physical layout file (e.g., GDS/OASIS) into a set of constituent patterns (also referred to herein as "layout decomposition," described in further detail below). In some embodiments, the decomposition process itself is not arbitrary, but may be governed by a set of geometric rules or heuristics that may be specified or customized by a user. The rules may be based on both common-sense assumptions about what constitutes the most critical and/or consequential features in the layout file (e.g., those features or types of geometries that might impact or affect yield), and on any specific learning that has taken place (e.g., through trial fabrication runs, simulations, previous knowledge, etc.). In some embodiments, any additional patterns that may be located within a user-specified distance from the constituent patterns are added to the constituent patterns. This has the effect of bringing in or assimilating the immediate "neighborhood" of the constituent pattern. The neighborhood may also be used as a factor in determining whether any fabrication-related problem affecting the main pattern might in fact be impacted by the neighborhood surrounding the main pattern.

The constituent patterns thus obtained through decomposition may be numerous (e.g., numbering in the millions or billions), and many of the patterns may look exactly the same (e.g., because a microchip design may contain a large number of repetitive structures). In some embodiments, the constituent patterns are compared among themselves to determine which ones are unique and which ones are repeats. This may be accomplished, for example, by a pattern grouping algorithm that groups all repeated patterns together into their own bins, thereby providing, in some embodiments, a list of the unique patterns, as well as the frequency of each bin. Some unique patterns may have numerous instances (e.g., numbering in the thousands or even millions of repeated instances). In some embodiments, the location in the physical layout file (e.g., GDS/OASIS) of each instance is preserved. A repeated instance of a unique constituent pattern may appear in the same orientation as the constituent pattern, or it may appear in a rotated and/or flipped orientation. For example, for an L-shaped constituent pattern, a repeated instance might be rotated 90-degrees or 270-degrees or flipped along the x-axis or flipped along the y-axis, etc. In some embodiments, a unique constituent pattern and all of its repeated instances—in any rotation or flip orientation—are grouped together and treated as a single unique constituent pattern, and the orientation information of each instance is preserved. In other embodiments, the rotated and/or flipped orientations of repeated instances are placed into separate groups, where each group accommodates one or more specific orientations, and each group represents a different unique constituent pattern. Each of the constituent patterns is subsequently assigned criticality scores (or ranks) based on multiple data sources, as described in further detail below. Collectively, the set of constituent patterns and their rankings are referred to as the Pattern Decomposition and Ranking Database. The Pattern Decomposition and Ranking Database supports the Pattern Centric Process Control technique described herein.

The Pattern Decomposition and Ranking Database has both feed-forward and feed-backward applications, as well as process monitoring applications. Various examples of these applications are described in further detail below.

A set of unique constituent patterns numbering in the millions or billions may have little practical value because these patterns may or may not have any difficulty being fabricated in a consistent or consistently good manner. In some embodiments, in order to employ feed-forward and feed-backward applications, these patterns are ranked to determine which ones are most sensitive to failure (i.e., weak patterns or hotspots). Feed-forward applications such as inspection and diagnostic operations may then be more effectively directed to the most suspect patterns. Conversely, feed-backward applications such as the fine-tuning of simulation models, machine learning models, and other computational models that depend on empirical data, can be significantly enhanced. In addition to feed-forward and feed-backward applications, a third type of application is process monitoring. Process monitoring determines if patterns on product wafers are being printed in a consistent or consistently good manner over a period of time so that weak patterns, process drifts, and process variations may be concretely identified.

In some embodiments, any pattern that begins to degrade indicates that a process drift or variance is occurring. These drifts or variances may be natural (i.e., random drift or drift arising from natural wear-and-tear of one or more components of manufacturing tool) or may be indicative of systemic problems in manufacturing tools. Identifying these drifts and variances assists in ensuring long-term stability of the fabrication process.

In some embodiments, process monitoring is also used to identify real weak patterns and to rank the criticality of those patterns in the Pattern Decomposition and Ranking Database. Process monitoring is especially beneficial because it is based on real, empirical data instead of, or in addition to, simulations or statistical analyses.

An example of the Pattern Centric Process Control technique/mechanism is as follows:

Decompose, as described above, the physical layout of a microchip design (e.g., GDS/OASIS file) into, for example, a set of unique constituent patterns. In some embodiments, decomposition is not done arbitrarily, but may be based on a set of geometric rules. In some embodiments, any additional patterns that may be located within a user-specified distance from the constituent patterns are added to the constituent patterns. This has the effect of bringing in or assimilating the immediate "neighborhood" of the constituent pattern. The neighborhood may also be used as a factor in determining whether any fabrication-related problem affecting the main pattern might in fact be impacted by the neighborhood surrounding the main pattern.

Rank the criticality of constituent patterns using, in various embodiments, simulation, statistical/computational, and empirical techniques. Update the rankings as new empirical data comes in, or as improvements in simulation or statistical/computational methods are available. The set of constituent patterns and their rankings form the Pattern Decomposition and Ranking Database.

Use the ranking information in a feed-forward manner to drive, for example, wafer inspection (e.g., optical, eBeam, etc.) and wafer imaging (e.g., SEM, eBeam, etc.) tools in the fab.

Analyze high resolution images of wafers (e.g., SEM, eBeam, etc.) by, for example, aligning the content of those images to the corresponding area of the microchip physical layout (e.g., GDS/OASIS) in order, for example, to detect deviations (or defects) by comparing the features in the image against the same features in the reference layout. Additionally, in some embodiments, measurements of carefully chosen features in the image are taken and some or all of the associated information (e.g., the image, the contour, the corresponding reference layout, the measurement, etc.) are also stored in the Pattern Decomposition and Ranking Database. All of the deviations detected, measurements made, contours extracted, and other information thus gained from the analysis of high-resolution images are used to calculate empirical ranking scores for the patterns and features of interest within the images, and the ranking information is stored into the Pattern Decomposition and Ranking Database. In some embodiments, instead of and/or in addition to storing such information in the Pattern Decomposition and Ranking Database, the information is stored in a separate data store (also referred to herein as a real silicon pattern quality database).

Compare the information contained in the Pattern Decomposition and Ranking Database with, for example, an OPC Verification report (or, for example, by subjecting some or all of the unique constituent patterns to an on-demand OPC simulation in order to obtain a comprehensive simulation result) to identify, in various embodiments, major and minor discrepancies between the OPC simulation of the pattern and the actual printed pattern. This is referred to herein as "In-Wafer OPC Verification."

In some embodiments, because high resolution images (SEM images, eBeam images, etc.) of actual printed wafers may not cover the entire wafer or even all of the patterns contained within a single die, the empirical data set may be limited in coverage. For example, the empirical data set may not provide full coverage—that is, many or most patterns in the set of unique constituent patterns may not have the option of being ranked or judged by data from product wafers (e.g., non-test wafers such as production and/or R&D wafers) because those patterns were not detected in any of the images processed by the system up to that point in time. An example technique for nevertheless assigning some form of empirical ranking to these patterns is as follows. In some embodiments, Machine Learning techniques are employed. For example, real world data (e.g., data from inspections, images, and measurements of actual printed/fabricated wafers), which may be limited, provided by high resolution images, is used, in some embodiments, to train a machine to distinguish good patterns from bad patterns. In some embodiments, this may be readily performed because both the reference pattern information from the microchip design file, as well as the actual printed pattern information from the high-resolution image file, is available. In some embodiments, once a sufficient training set has been provided, the machine can begin to make predictions on any new patterns. In some embodiments, the machine may therefore run through the entire list of unique constituent patterns obtained, for example, through the decomposition of the microchip layout file and predict the weak patterns. While the prediction may not be 100% accurate, in some embodiments, it may be sufficient to generate a list of locations on the wafer that warrant closer scrutiny by subjecting those locations to, for example, optical, SEM, or eBeam inspection. Further details regarding machine learning to improve coverage of empirical data-based ranking of unique decomposed patterns is described below.

FIG. 1A illustrates an embodiment of an overview of pattern centric process control. An example of the broad-based nature of Pattern Centric Process Control is illustrated in the example of FIG. 1A. As shown in the example of FIG. 1A, at 101, design layout pattern decomposition and signature extraction are performed. In some embodiments, step 101 includes preparing a full chip Pattern Decomposition and Ranking Database (described in further detail below)

with pattern ranking history. Step 101 further includes pattern grouping and risk ranking based on the extracted signatures.

At 102, Optical Proximity Correction (OPC) verification and contour simulation of decomposed patterns is performed. In this example, the processing performed at step 102 is an example of simulation-based prediction of pattern rank, which will be described in further detail below. For example, OPC simulation is routinely performed at ADI (After-Develop Inspection) and AEI (After-Etch Inspection) operations in the fabrication cycle, which produces a list of simulation-based weak points for these process steps. In some embodiments, the results of all such OPC simulations can be cross-referenced with the full set of constituent patterns (that were generated by decomposing the full chip) in order to assign a simulation-based risk score to the cross-referenced patterns. In other embodiments, the OPC simulation can be performed in an on-demand manner on any or all of the constituent patterns that were generated by decomposing the full chip. In this case a simulation-based risk score may be obtained directly for each of the constituent patterns. In some embodiments, such ADI and AEI simulations on decomposed patterns are performed for risk and sensitivity ranking.

At 103, bright field defect inspection is performed. The result of the bright field inspection is a list of defect coordinates and attributes or properties of each defect. The defect list is cross-referenced with the set of constituent patterns in the Pattern Decomposition and Ranking Database. The risk ranking factors already assigned to any of the matching constituent patterns are used to select the most relevant subset of inspection defects that will subsequently be imaged on a high-resolution imaging tool such as a Scanning Electron Microscope (SEM). This approach of selecting a relevant subset results in an intelligent sample plan for the SEM Review tool (whose relatively slow speed, in practice, prohibits the imaging of every single detected defect). The high-resolution images generated by the SEM Review tool for the chosen (or sampled) defects are analyzed by die-to-database (also referred to herein as "D2DB") techniques to precisely identify both "soft" and "hard" defects. Such defects are also known as defective patterns (hard defects) and weak patterns (soft defects). In addition to identifying soft and hard defects, the images are also used to measure line widths, line spaces, and other attributes of all or selected portions of the image. The measurements are compared with the matching portions of the reference design in order to determine the amount of variance or deviation from the intended patterns. In some embodiments, bright field inspection is optionally performed. In other embodiments, in addition to and/or in place of bright field inspection, eBeam inspection may be used. Because of the relatively slow speed (but much higher resolution) of eBeam inspection, an optimal set of eBeam regions-of-interest (ROI) is generated. These are the regions on the chip or the wafer that will be inspected by the eBeam inspection tool. eBeam regions-of-interest can be generated by examining the risk factors assigned to each of the constituent patterns in the Pattern Decomposition and Ranking Database. In some embodiments, constituent patterns having moderate to high risk factors may be used to generate eBeam regions-of-interest.

At 104, local area eBeam inspection is performed based on the regions-of-interest determined at 103. The eBeam inspection tool generates a list of defects and/or high-resolution images within the regions-of-interest. These high-resolution eBeam images are subsequently analyzed using die-to-database techniques to precisely identify both soft defects (weak points) and hard defects (defective patterns). In addition to identifying soft and hard defects, the images are also used to measure line widths, line spaces, and other attributes of all or selected portions of the image. The measurements are compared with the matching portions of the reference design in order to determine the amount of variance or deviation from the intended patterns. Additionally, some parts of the overall pattern that is printed on the wafer may be slightly shifted in X and/or Y directions. By overlaying SEM, eBeam, and other high-resolution images of printed patterns with the matching or corresponding portions of the reference design, these X and/or Y shifts may be calculated. These shifts are more commonly known as Edge Placement Errors or EPE.

At 105, the ranking information in the Pattern Decomposition and Ranking Database is updated automatically from the analysis of large numbers of high-resolution images coming from multiple process layers. Patterns contained within the Pattern Decomposition and Ranking Database are given ranking or criticality scores from (a) simulation-based methods such as OPC, (b) statistical and geometrical methods such as design signatures, (c) other computational methods, and (d) empirical or actual results from high-resolution images, eTest data, parametric data, and other diagnostics data generated from the physical wafer. The first three types of ranking techniques are collectively referred to herein as "predictive" ranking techniques. The analysis of any diagnostic or process data emanating from physical wafers, such as high-resolution images, produces the fourth kind of ranking—the empirical kind. When a suitable number of high-resolution images have been processed, Process Variation Bands (PVB) may be generated for the patterns in the Pattern Decomposition and Ranking Database. In one embodiment, a Process Variation Band is produced by stacking the contours of multiple occurrences of the same pattern. Contours of each occurrence of each pattern are extracted from high-resolution images generated by SEM, eBeam, or other suitably capable tools. A pattern's PVB provides a clear and comprehensive visual indication of the fidelity (or lack thereof) of the pattern. Statistics may also be extracted from the PVB, but whereas statistics constitute a reduction or condensation of information, a PVB preserves information. The Pattern Decomposition and Ranking Database can also be used for In-Wafer OPC Verification, which includes cross-referencing OPC's list of predicted weak patterns against the empirical rankings of patterns in the Pattern Decomposition and Ranking Database. If OPC predicts that Pattern A should be weak, and empirical data for the same pattern in the Pattern Decomposition and Ranking Database concurs, then it can be concluded that the OPC model made a good prediction. However, if the OPC predictions of some patterns do not agree with empirical results in the Pattern Decomposition and Ranking Database, then it provides an instructive feedback loop to fine-tune or otherwise recalibrate the OPC simulation models. Furthermore, the Pattern Decomposition and Ranking Database provides the ability to trace the history of hotspots—namely, to determine when they were first seen, at which process layers did they occur, did they become weaker over time, did they remain stable over time, did they improve when a mask revision or process revision was made, etc. Another application of the Pattern Decomposition and Ranking Database is the determination of Lithography Process Window (or simply the Process Window), which helps determine the ideal focus and exposure settings for the lithography tool that transfers the patterns in the physical layout of the chip onto the wafer surface. Even under the optimum focus and exposure settings, some patterns may exhibit a greater degree of variability than other patterns. Identifying these potential "Process Window Limiters" allows OPC and process teams to begin to explore solutions quickly. As yet another application of the Pattern Decomposition and Ranking Database, the fabrication or yield risk of a new chip (also referred to as a device) may be assessed by leveraging all available information in the Pattern Decomposition and Ranking Database. More specifically, the layout of the new chip is first decomposed into a set of constituent patterns using the same methods as were used for the patterns in the Pattern Decomposition and Ranking Database. Next, the new constituent patterns are compared against those already in the Pattern Decomposition and Ranking Database. When a matching pair is found, all of the matching pattern's risk ranking information from the Pattern Decomposition and Ranking Database is applied to the new design. When the risk ranking information for all matching patterns is tabulated, an overall risk estimate for the new device can be calculated. Further, because the new device may contain new and unique patterns for which no risk information yet exists in the Pattern Decomposition and Ranking Database, predictive techniques may be used to calculate an estimation of risk for the new patterns. This is described further in 106 below. When such risk assessments are completed for the constituent patterns of the new device, the patterns having moderate to high risk scores may be used, for example, to generate regions-of-interest (ROI) for subsequent bright field, eBeam, or other inspection and review operations.

At 106, predictive techniques are applied to estimate the risk of at least two kinds of patterns: (1) constituent patterns of current in-production chips for which no high-resolution or other empirical data has yet been made available, and (2) unique never-before-seen constituent patterns of new chips that are about to enter production. In some embodiments, the predictive techniques comprise one or more machine learning algorithms including, but not limited to Support Vector Machines (SVM), K-Nearest Neighbor, Convolutional Neural Networks, and Deep Learning. In some embodiments, the predictive techniques comprise simulation, statistical, and other computational and model-based techniques. Predictive techniques may rely on all or any subset of the pattern and ranking information held in the Pattern Decomposition and Ranking Database. These techniques "study" this information to determine what factors might lead to a pattern being weak, and what factors might lead to a pattern being strong. The more information the database accumulates over time, the more improved the prediction model becomes. For new devices—known, for example, as New Tape Outs or NTOs—using the Pattern Decomposition and Ranking Database to assess risk of known patterns and using predicted risk assessments for the unique never-before-seen patterns allows, for example, for the creation of more intelligent regions-of-interest (ROI) for subsequent wafer inspection and review purposes.

Further details regarding various aspects of pattern centric process control are described below.

Figure 1B:
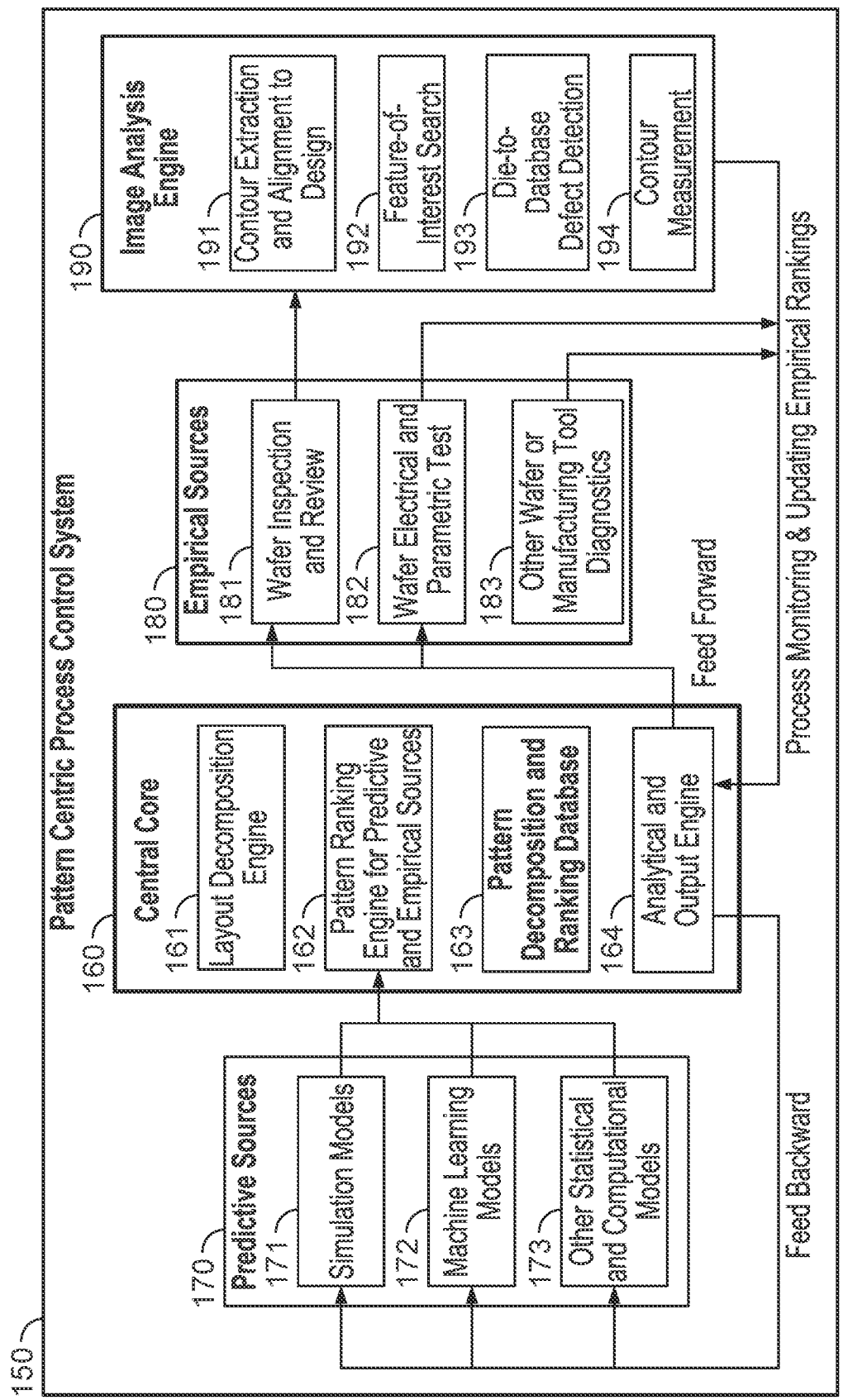
FIG. 1B illustrates an embodiment of a system for performing pattern centric process control.

FIG. 1B illustrates an embodiment of a system for performing pattern centric process control. Pattern centric process control system 150 is also referred to herein as "the system." As shown in this example, pattern centric process control system 150 includes Central Core 160, which further includes Layout Decomposition Engine 161, a Pattern Ranking Engine for predictive and empirical sources 162, the Pattern Decomposition and Ranking Database 163, and an Analytical and Output Engine 164 that provides applications and services to the end user, and interfaces the Central Core with external components. One of the external components is a set of Predictive Sources 170 that provide information usable to rank patterns in the Pattern Decomposition and Ranking Database. Predictive sources include simulation models 171 such as Optical Proximity Correction (OPC) simulation, machine learning models 172 (e.g., Support Vector Machines, Deep Learning, etc.), and other statistical and computational models 173 such as computation of geometric design signatures. Information held in the Central Core 160 is analyzed and output (feed-forward) via the Analytical and Output Engine 164 to Wafer Inspection and Review equipment 181 and Wafer Electrical and Parametric Test equipment 182. Results generated by Empirical Sources 180 are copied to the Analytical and Output Engine 164, which uses the empirical information for process monitoring and for updating empirical ranking information in the Pattern Decomposition and Ranking Database 163. Additionally, the Analytical and Output Engine 164 also sends pattern ranking information from the Pattern Decomposition and Ranking Database 163 back to the predictive sources 170 in order for the models, algorithms, and other parameters in those sources to be fine-tuned by taking advantage of continuously up-to-date information in the Pattern Decomposition and Ranking Database 163, such as the ranking data emanating from empirical sources 180. This is the feed-backward loop. The Analytical and Output Engine 164 may also be configured to output information to factory control systems (such as work-in-progress or WIP management systems), end-user reports (such as HTML pages, Excel files, PPT reports, etc.), and other Fab automation, computation, analysis, visualization, reporting, and database systems. Lastly, the most critical type of empirical data from Wafer Inspection and Review tools 181 is the high-resolution image. The image is such an important part of the system that an Image Analysis Engine 190 is devoted to it.

Layout decomposition engine 161 is configured to decompose a layout of a semiconductor chip into intended circuit layout patterns (also referred to herein as "decomposed circuit layout patterns," "intended circuit layout patterns," or "unique constituent patterns"), which are used to populate the Pattern Decomposition and Ranking Database 163. Further details regarding layout decomposition are described below.

Pattern Ranking Engine 162 is configured to determine fabrication risk assessments (or otherwise score or rank) of the unique constituent patterns in the Pattern Decomposition and Ranking Database 163. In some embodiments, the fabrication risk assessments are used to assess the manufacturability of intended or decomposed circuit layout patterns (e.g., critical and/or consequential patterns identified from the layout decomposition). For example, the assessments are used to determine which circuit layout patterns are most or least yield relevant (i.e., which patterns are more difficult to manufacture, and which patterns are easier to manufacture).

Pattern Ranking Engine 162 is configured to rank the patterns based on information from various sources, including, for example, predictive 170 and empirical 180 sources. Predictive ranking sources 170 include simulation models 172, which, as one example, use optical proximity correction (OPC) simulation to predict fabrication risk assessments for the intended circuit layout patterns. As shown in this example, predictive sources 170 further include Machine Learning Models 172, which, as one example, use Support Vector Machines (SVM) or Convolutional Neural Networks (CNN) to predict the yield risk of patterns. Predictive sources 170 also include statistical and computational models 173, which, as one example, generate design signatures of the intended circuit layout patterns and predict fabrication risk assessments for the intended circuit layout patterns using the generated design signatures. Empirical ranking sources 180 include Wafer Inspection and Review tools 181, which, as one example, include optical and eBeam inspection tools, and scanning electron microscopy (SEM) for high-resolution review and imaging tools. Empirical sources 180 also include Electrical and Parametric Test equipment 182, which, as one example, comprise fault candidates from automated test program generation (ATPG) diagnostics functions. Empirical sources 180 may include other wafer and manufacturing tool diagnostics data 183.

In various embodiments, the empirical data from Wafer Inspection and Review tools 181 includes a list of defect coordinates on the wafer, a set of optical attributes for each defect, and one or more high-resolution images for at least some of the defects. The high-resolution images are used in the extraction of empirical ranking information. Image Analysis Engine 190 is configured to process these high-resolution images. The Image Analysis Engine 190 performs a number of functions on each high-resolution image, such as contour extraction and subsequent alignment of the contour to the reference design 191. The portion of the reference design that is aligned to the image contour is then searched for the existence of any features of interest by using a geometric search engine 192. Features of interest are those elements of the pattern that are considered to be critical or consequential, and therefore should be analyzed and tracked. The features of interest thus identified are then subjected to a die-to-database (D2DB) defect detection 193 that checks for the presence of any of a number of defect types such as, but not limited to, full or partial line breaks, full or partial line bridges, line end pullbacks, extra or extraneous pattern, and missing pattern. Contours of the features of interest are also measured in any of several ways such as, for example, line width and line edge roughness measurements. All of the results from the Image Analysis Engine 190 are returned to the Central Core 160, where the data is ultimately captured and archived in the Pattern Decomposition and Ranking Database 163.

The engines described above can be implemented as software components executing on one or more processors, as hardware such as programmable logic devices and/or Application Specific Integrated Circuits designed to perform certain functions or a combination thereof. In some embodiments, the engines can be embodied by a form of software products which can be stored in a nonvolatile storage medium (such as optical disk, flash storage device, hard disk drive, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-engines.

Layout Decomposition

In some embodiments, the pattern centric process control system is supported by the set of unique constituent patterns formed, for example, through a geometric rule-based decomposition (e.g., step 101 of FIG. 1A) of the microchip physical layout file (e.g., GDS/OASIS). Such geometric rule-based decomposition is also referred to herein as "design layout pattern decomposition," "physical layout decomposition," and "full chip layout decomposition." In some embodiments, design layout decomposition is performed using layout decomposition engine 161 of system 150.

As one example, full chip layout decomposition is performed as follows. One or more geometric rules or heuristics are applied over the physical layout file to extract patterns (e.g., "intended circuit layout patterns" or "constituent layout patterns" or "decomposed patterns") that meet, for example, the criteria defined in the rules. In some embodiments, the geometric rules are specified to identify certain types of geometries, or critical and consequential features—that is, those features that are likely to impact yield, or are otherwise features of interest. In some embodiments, the heuristic rules that are performed over the layout file define critical and consequential features. Critical features include those geometric features that may be "marginal" or weak features that may have a higher failure or defect probability (failure to be fabricated properly, or probability of resulting in the printed pattern being a complete or partial defect). As one example, U-shaped patterns are commonly problematic, particularly when there is a line that interrupts the 'interior' of the U-shape. Consequential features include those features that may or may not have been predicted or simulated or otherwise concretely expected to exhibit a failure, but that should nevertheless be monitored or tracked. The heuristic rules for identifying features of interest may be determined based on historical empirical data, simulation (e.g., Optical Proximity Correction (OPC) simulation), human intuition formed from past experience, or other predictive techniques.

In some embodiments, the maximum size of the patterns may be limited. For example, any additional patterns that may be located within a user-specified distance from the critical and consequential features are added to the constituent patterns. This has the effect of bringing in or assimilating the immediate "neighborhood" of the critical or consequential feature. The neighborhood may be used as a factor in determining whether any fabrication-related problem affecting the main pattern might in fact be impacted by the neighborhood surrounding the main pattern. The constituent patterns thus extracted may be numerous (e.g., numbering in the millions or billions), but not all of them may be unique. In some embodiments, most constituent patterns will have numerous identical twins located in different parts of the physical layout. In some embodiments, pattern grouping is performed to group all sets of twins into their own groups. In some embodiments, the pattern grouping results in reducing the data to a set of unique constituent patterns. Even this set may be large, containing, for example, millions of members. In some embodiments, this process of pattern grouping does not discard any information about the twins (or repeat instances of the pattern). Instead, in some embodiments, a list of unique patterns is maintained along with the location of each repeated instance of each unique pattern. A twin or repeated instance of a constituent pattern may appear in the same orientation as the constituent pattern, or it may appear in a rotated and/or flipped orientation. For example, for an L-shaped constituent pattern, a twin or repeated instance might be rotated 90-degrees or 270-degrees or flipped along the x-axis or flipped along the y-axis, etc. In some embodiments a unique constituent pattern and all of its repeated instances—in any rotation or flip orientation—are grouped together and treated as a single unique constituent pattern, and the orientation information of each instance is preserved. In other embodiments, the rotated and/or flipped orientations of repeated instances are placed into separate groups, where each group accommodates one or more specific orientations, and each group represents a different unique constituent pattern. In some embodiments, the decomposition of the layout into patterns (e.g., critical and consequential features along with neighboring patterns) is performed for each layer of the circuit layout (e.g., diffusion layer, polysilicon layer, contact layer, metal 1, via 1, metal 2, via 2, etc.) or any combination of circuit layout layers.

After scouring the full circuit layout or physical design of the chip, the unique constituent circuit layout patterns are placed into a database such as the Pattern Decomposition and Ranking Database 163 of system 150.

Further Details Regarding Full Chip Layout Decomposition

In some embodiments, the full chip layout decomposition described above is a form of pre-processing that is performed, for example, before the physical wafer begins its manufacturing journey, to decompose the physical layout file into a set of unique patterns. The Pattern Decomposition and Ranking Database is then pre-populated using the unique identified patterns. In one example embodiment of full chip layout decomposition, an entire layout is comprehensively swept/evaluated using feature identification rules such as the geometric rules described above to identify features of interest. Reference patterns (i.e., intended circuit layout patterns or decomposed circuit layout patterns) are generated for each occurrence/location of a feature of interest by extracting or capturing the areas within a certain vicinity or neighborhood or radius (e.g., circular or square radius) of the center points of the identified features.

The use of the radius allows for the immediate neighborhoods of features-of-interest to be taken into account. This allows, for example, for proximity effects to be considered. Take, for example, comb-shaped patterns as features of interest. Comb patterns (in the shape of a hair comb with two or more fingers) typically have a higher propensity to fail. However, not all comb patterns or even twin copies of comb patterns located elsewhere in the design have the same probability of failure, where the propensity for a comb pattern to fail may be dictated by, or dependent to varying degrees on, the patterns in the neighborhood of the comb. For example, many of the failures may be due to optical proximity effects, where the optical proximity to a feature may cause failures such as bridges. That is, other patterns proximate to a feature of interest will impart different influences on how the feature is fabricated. The use of the radius brings in the proximate or neighboring patterns because they may have an influence on the defectivity of the feature of interest.

In some embodiments, the (square) radius defined around the center of a feature of interest (forming a box surrounding the feature of interest) is user-defined, causing a certain amount of the neighborhood in the vicinity of the feature of interest to be extracted as the decomposed pattern. Thus, even if the same feature of interest (e.g., same comb) is identified, if the neighborhoods (within the defined radius) of the feature of interest in any two locations are different, then two different circuit layout patterns will be extracted (and stored as different entries or unique patterns in the Pattern Decomposition and Ranking Database 163).

In some embodiments, the radius is a single global radius that is applied when extracting regions surrounding any feature of interest. In other embodiments, radii are defined per heuristic rule. For example, different radii may be specified for the tip-to-edge rule, comb-pattern rule, etc. (where, for example, the radius for the rule identifying comb patterns/features is different from the radius used for the rule identifying tip-to-edge patterns/features).

As described above, pattern grouping is performed to determine the unique patterns among the patterns that are extracted from the layout of the semiconductor chip. For example, all of the identified patterns are grouped or de-duplicated to identify only unique or distinct patterns. As one example, suppose that after physically decomposing an entire design, millions of occurrences of critical and consequential features are identified. Each rule that is used to search the design may result in numerous matches. For example, suppose that after running the tip-to-edge rule, millions of tip-to-edge features are identified. When radii are extended about each of the tip-to-edge features, millions of patterns surrounding or encapsulating each of the identified features result. Pattern grouping is performed on the generated patterns to identify the unique or distinct patterns. For example, the generated patterns are compared against each other, and patterns that are determined to be the same are grouped together. For example, millions of tip-to-edge patterns that are extracted may ultimately result in only two thousand groupings, indicating that there are only two thousand unique patterns with tip-to-edge features in the design. The comparison can be made by matching patterns based on their geometries.

Thus, repeated instances of patterns can be identified and grouped together to determine the unique and distinct patterns. The unique and distinct patterns are then added to the Pattern Decomposition and Ranking Database. The populated Pattern Decomposition and Ranking Database can be used to track the patterns in fabricated wafers/devices. In some embodiments, a separate, real silicon pattern quality database is updated instead, and the tracking of patterns is performed by cross-referencing a real silicon pattern quality database, as will be described in further detail below.

The following is another example of the process for performing layout decomposition. In some embodiments, the process described below is executed by layout decomposition engine 161. A reference physical design is obtained. As described above, examples of reference designs include physical layout files such as Graphical Data System (GDS) and Open Artwork System Interchange Standard (OASIS) files.

Features of interest are identified in the obtained reference design. For example, a geometric rule-based pattern search engine, in which geometric rules such as "minimum line width" or "minimum line space" or other critical and consequential features are specified, can be run on the obtained reference design to identify features of interest (e.g., various types or shapes of geometries) in the obtained reference design.

A pattern is extracted for each identified feature of interest. For example, as described above, a surrounding pattern centered on an identified feature of interest (e.g., that is within a particular radius of the identified feature of interest) is extracted from the obtained reference design. The radius may be a square radius (forming a square around the feature of interest) or a circular radius. In some embodiments, the radius is user-defined. The radius may also be defined on a per-geometric rule basis.

The patterns extracted from the reference design are evaluated to determine unique patterns. In some embodiments, the unique patterns are determined by performing pattern grouping of the patterns extracted from the reference design. For example, the extracted reference patterns that are the same can be binned, grouped, or clustered together, where each group corresponds to a unique pattern.

The unique patterns determined from the patterns extracted from the reference design or layout of the semiconductor chip are added to the Pattern Decomposition and Ranking Database 163 as reference or intended circuit layout patterns to be ranked. For example, the unique patterns are added as new entries in the Pattern Decomposition and Ranking Database. As one example, each unique pattern is associated with a corresponding row in a table of reference patterns in the Pattern Decomposition and Ranking Database.

After the unique constituent patterns are established in the Pattern Decomposition and Ranking Database, the unique constituent patterns may then be ranked, as will be described in further detail below. The ranked Pattern Decomposition and Ranking Database may then be further used to facilitate monitoring, inspection, and control of semiconductor circuit layout pattern printing and processing, examples of which will also be provided below.

Figure 2:
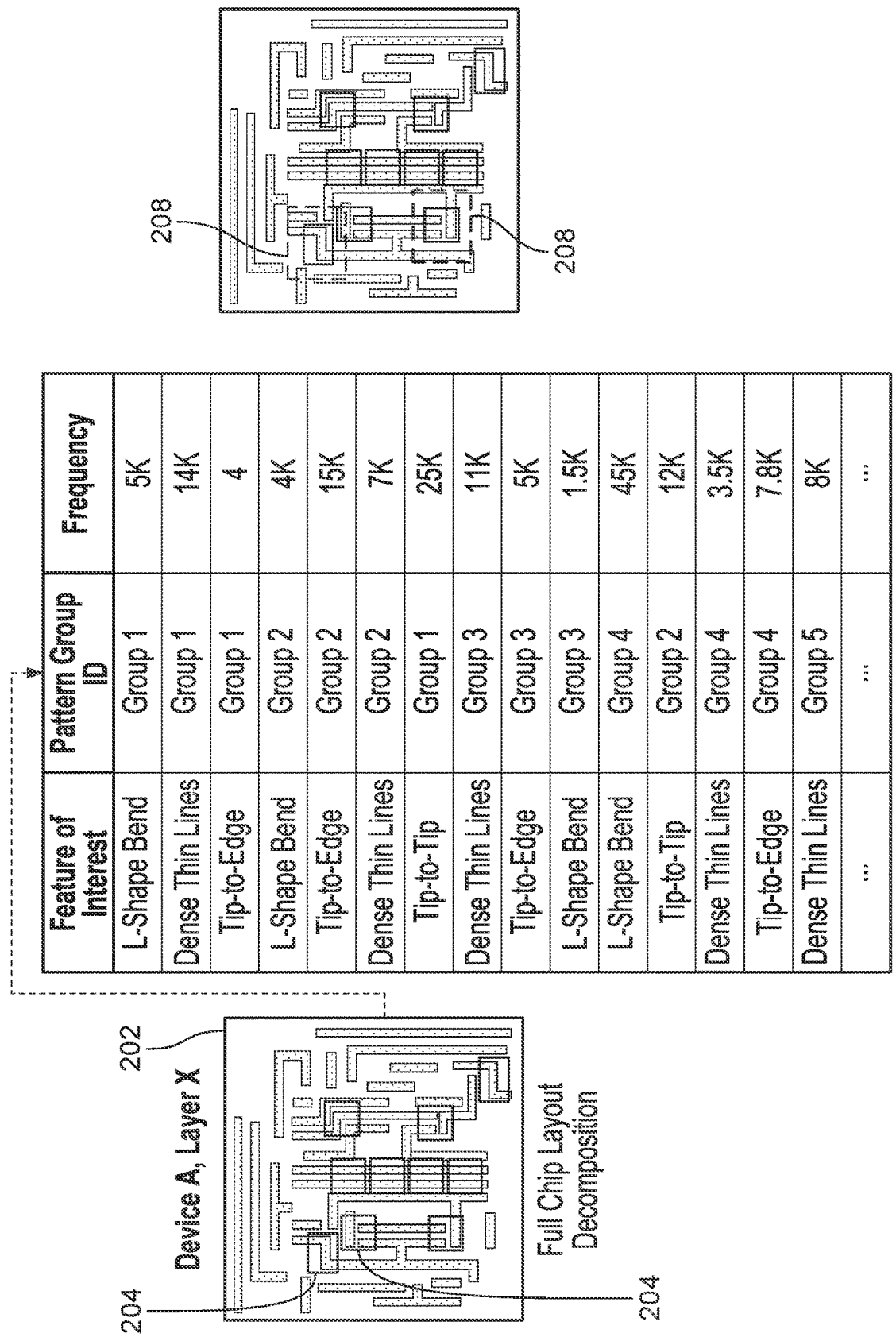
FIG. 2 illustrates an example decomposition of a design layout into patterns based on geometric rules.

FIG. 2 illustrates an example decomposition of a design layout into constituent patterns based on geometric rules. In the example of FIG. 2, the layout of a layer of a device 202 is shown. The pattern decomposition described above is performed on the layout of the chip, such that the entire chip is searched using, for example, a geometric rule-based engine, for the presence of a set of features-of-interest such as, for example, dense thin lines, tip-to-tip features, tip-to-edge features, L-shape bends, etc. Various constraints may be applied to the search rules for each type of feature-of-interest, such as, for example, searching for tip-to-tip features where the width of the tip is less than a specified amount and the gap or space between tips is also less than a specified amount. The result of the search may net a large number of features-of-interest 204. In some embodiments, a small user-specified amount of the neighborhood surrounding the feature-of-interest is added to each feature-of-interest, resulting in a slightly extended pattern-of-interest 208. Many of these patterns-of-interest may be identical to each other but located in different parts of the chip layout. In some embodiments, the "raw" set of patterns-of-interest is reduced into a smaller set of unique patterns-of-interest. In some embodiments, pattern grouping is performed to determine set of unique patterns-of-interest, the result of which builds, for example, table 206. Note that pattern-of-interest is the same as feature-of-interest when the user-specified extension is zero. Each row in table 206 is a unique pattern, and certain information about the pattern is also preserved in the table, such as, for example, the name or identifier (ID) of the geometric rule that found the central feature-of-interest, the ID of the pattern group, and the number of occurrences of the pattern-of-interest. For example, row 2 in table 206 represents one specific variation of the larger pattern-of-interest centered on a Dense Thin Lines feature-of-interest. In this example, this particular variation was found to have 14,000 occurrences over the full layout of the chip at the chosen Layer X. All of this information is added to the Pattern Decomposition and Ranking Database 163. In some embodiments, the location of each occurrence of each pattern-of-interest (including repeat occurrences of the pattern-of-interest) is also stored in the Pattern Decomposition and Ranking Database.

Ranking Intended Circuit Layout Patterns in the Pattern Decomposition and Ranking Database Once the Pattern Decomposition and Ranking Database is established using the layout decomposition described above, various sources of information are then used to rank the intended circuit layout patterns in the Pattern Decomposition and Ranking Database. Described below are details regarding embodiments of ranking the intended circuit layout patterns in the Pattern Decomposition and Ranking Database 163. In some embodiments, ranking the intended circuit layout patterns includes determining fabrication risk assessments for each of the decomposed patterns. In some embodiments, the fabrication risk assessments are used to rank the yield significance of the intended circuit layout patterns. In some embodiments, each intended circuit layout pattern is assigned a corresponding set of fabrication risk assessments, where each of the individual fabrication risk assessments in the set is determined from information obtained from a particular source of information. The various sources of information include predictive sources—such as statistical, computational, simulation, and machine learning methods—and empirical sources—such as wafer inspection results, images, functional and parametric test results, process tool data, and other diagnostic data obtained from printed circuit layout patterns. The various sources of data may be used to judge the yield marginality or process marginality of the constituent layout patterns, as well as the strength and weakness of the constituent layout patterns.

In some embodiments, each source of information used to rank or determine fabrication risk assessments for the intended circuit layout patterns is associated with a corresponding reliability and a corresponding coverage. In some embodiments, reliability refers to the accuracy of fabrication risk assessments based on information from the source. Coverage refers to the percentage of the constituent layout patterns for which fabrication risk assessments can be made using information from the source (i.e., what percentage of patterns in the chip design are covered by source). For example, while empirical data for a circuit layout pattern is highly reliable (because it is actual data collected about the printed version of a pattern), the empirical data may only be available for a small subset of patterns (because it may come from images of small portions of the chip), and thus have relatively poor coverage. On the other hand, ranking based on predictive techniques such as OPC simulation or design signatures may be used to determine fabrication risk assessments for all constituent layout patterns for a device (high coverage), but because the fabrication risk assessments are based on predictive techniques, the assessments are less reliable than empirical techniques (a predictive model will be less reliable than actual observed phenomena).

In some embodiments, each type of per-source ranking is stored separately rather than, for example, being rolled together into a single consolidated ranking. Thus, in some embodiments, each unique constituent pattern may have a ranking derived from design signatures, another ranking from simulation (such as OPC simulation), and another ranking from empirical data (such as SEM images and wafer inspections). Overall or rolled-up rankings based on the individual rankings may also be computed. Further details regarding prediction-based ranking and empirical data-based ranking are provided below.

Fabrication Risk Assessments Based on Predictive Source: Statistical Analysis

Fabrication Risk Assessments Based on Design Signatures

As described above, in some embodiments, the criticality of each pattern in the set of unique constituent patterns may be assessed, which, in some embodiments, is performed by calculating a series of design signatures for each unique pattern. In some embodiments, design signatures include statistical summaries; in various embodiments, examples of such signatures include (a) pattern complexity, (b) pattern directionality, (c) pattern density, (d) pattern homogeneity, etc. In some embodiments, because the calculation of these signatures requires only the microchip physical layout file (e.g., GDS/OASIS), they may all be calculated immediately.

In some embodiments, based on the design signatures calculated for each unique constituent pattern, a design-signature based risk ranking may then be calculated and assigned to each unique constituent pattern. As described in further detail below, additional rankings may also be assigned.

FIG. 3 illustrates an example embodiment of multi-source ranking of unique constituent patterns. For example, each row of table 300 represents or corresponds to a unique constituent pattern determined using the layout decomposition techniques described above. Column 304 is used to record the ranking by design signatures for each of the unique constituent patterns in column 302. As shown in this example, for illustrative purposes, the rankings or fabrication risk assessments based on signature calculations (statistical analysis-based computations) are assigned on a scale of (L)ow, (M)edium, or (H)igh risk, but a numeric scale, or any other scale, as appropriate, may also be used.

Fabrication Risk Assessments Based on Predictive Source: Simulation

Fabrication Risk Assessments Based on OPC Simulation

In some embodiments, now that a ranking has been computed based on design signatures, a second type of ranking may be computed, one, for example, that is based on Optical Proximity Correction (OPC) simulation (e.g., as shown at 102 of FIG. 1A). In some embodiments, OPC simulation is used to model the optics of the lithography (and/or etch) system (that exposes patterns onto the wafer surface) and apply that model to the physical layout file (e.g., GDS/OASIS). In some embodiments, the end result is a simulated rendition of the printed pattern. The simulated rendition may be an approximation, and, in some embodiments, this simulation may be performed individually on each of the unique constituent patterns in the Pattern Decomposition and Ranking Database 163, resulting in simulated renditions of the patterns. In some embodiments, this is referred to as "on-demand OPC simulation." In some embodiments, the simulation results are used to rank each of the constituent patterns, as shown, for example, in the column labeled "OPC Based Rank" (column 306) in the example of FIG. 3.

In some embodiments, other techniques are used instead of or in addition to on-demand OPC simulation; an example alternative approach is to cross-reference the standard OPC Verification Report (e.g., produced by standard full-chip OPC simulation) with the set of unique constituent patterns in the Pattern Decomposition and Ranking Database 163 and rank the patterns that are common between the two. The standard OPC Verification Report may only contain a list of patterns that the simulation model predicts to be weak or critical, which is a subset of the total diversity of patterns present on the chip. Therefore, cross-referencing the standard OPC Verification Report with the full set of unique constituent patterns in the Pattern Decomposition and Ranking Database may not be able to provide an OPC-based score to every constituent pattern, but only to a subset of the constituent patterns.

OPC simulation as a ranking source has high coverage because it can be performed over the entire layout file (and OPC simulation-based scores can be computed for each and every pattern in the design), but has lower reliability than empirical sources because it is based on a predictive model (e.g., its accuracy is dependent on the accuracy of the model that is used to perform the simulation), and there may be certain printing errors or weaknesses that the simulation is unable to predict. The OPC simulation may also flag false errors.

Fabrication Risk Assessments Based on Empirical Sources

Fabrication Risk Assessments Using High Resolution Images

Having computed rankings based two examples of predictive sources, (a) design signatures and (b) OPC simulation for each of the unique constituent patterns obtained from the rule-based decomposition of the microchip physical layout file (e.g., GDS/OASIS), as described above, empirical techniques are now described for ranking (e.g., as shown at 103 of FIG. 1A)—ranking techniques that are based, for example, upon product wafers in the fab.

In the fab there may be new wafer starts, for example, every day. These may include bare wafers that are beginning their months-long journey through a multitude of process and diagnostic steps through the fab. Each wafer may hold hundreds of microchips. Wafers may be grouped and processed in batches of, for example, one or two dozen. These groups of wafers typically stay together as they move through the fab, and are referred to as lots. One lot, therefore, may contain, for example, a dozen or two dozen individual wafers. In some embodiments, the schematic diagram of the microchip is printed on each wafer. This diagram (or physical layout) is usually composed of patterns in multiple 2-dimensional planes that are carefully stacked on top of each other. In some embodiments, these planes are referred to as design layers. The fabrication of a single design layer usually entails a handful of discrete process steps. For example, in some embodiments, to print the Metal-1 design layer, some of the process steps may include Metal-1 Exposure, Metal-1 Develop, Metal-1 Etch, Metal-1 Planarization, etc. Each of these is referred to as a process step. In some embodiments, the pattern centric process control techniques described herein ensure that the patterns on each of these 2-dimensional stacked planes are being printed correctly or are retaining their fidelity after each of the associated process steps where empirical observations are made (for example, after Metal-1 Develop, after Metal-1 Etch, after Metal-1 Planarization, etc.), and deviations are identified in order to take corrective action.

In some embodiments, effective pattern-based process control may depend on the ongoing monitoring of patterns from as many wafers in as many lots and from as many design layers as practical. Typical fabs implement line monitoring solutions that perform surface diagnostic scans or inspections of one or two wafers from each lot and dozens of process layers. These inspections may look for surface defects using fast optical or laser scattering techniques that indicate the presence of some kind of anomaly, but in some cases, there may not be enough sensor resolution to identify the defect type. In some embodiments, to identify the defect type, a subset of the defects is sent to a tool such as a Scanning Electron Microscope (SEM) that takes high resolution images but does so at a relatively slow speed. Because time is an expensive commodity in any manufacturing line, the relatively slow speed of a SEM tool means that relatively few (but carefully chosen) defects will be imaged in this manner. Nevertheless, because these images are already being collected routinely, the PCPC technique described herein may benefit from the ready access to these images. The PCPC technique described herein, moreover, may provide incentives for increasing the utilization of SEM tools (i.e. for taking significantly more images in order to enhance the yield learning and yield debug process, which ultimately leads to faster yield ramp and improved profitability).

Figure 4:
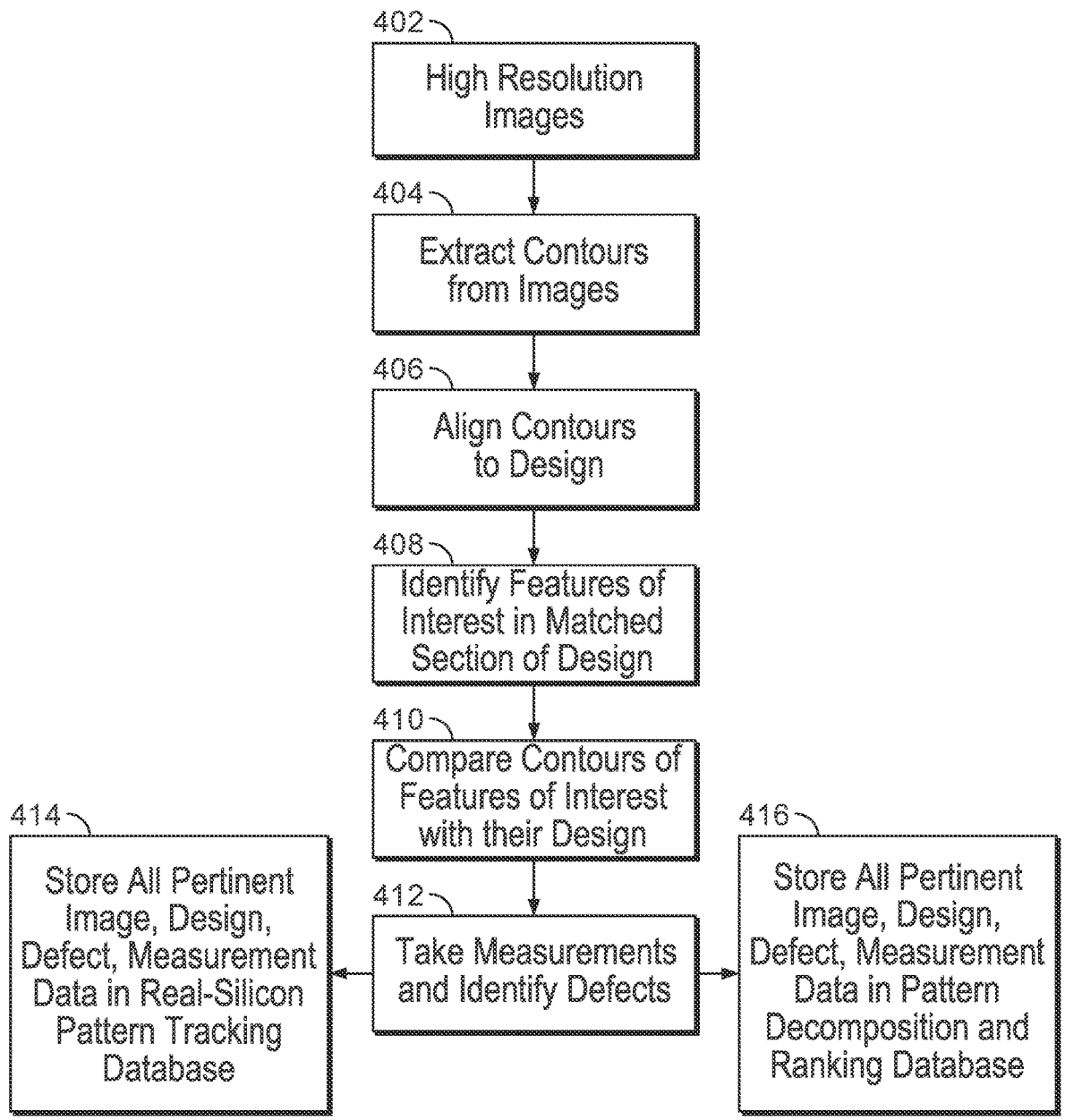
FIG. 4 illustrates an example embodiment of die-to-database defect detection and measurement.

In some embodiments, the PCPC technique described herein makes extensive use of high resolution SEM (and also, in some embodiments, eBeam) images of product wafers as illustrated in the example of FIG. 4.

FIG. 4 illustrates an example embodiment of die-to-database (D2DB) defect detection and measurement. In some embodiments, the die-to-database defect detection and measurement is performed by wafer image analysis engine 190 of system 150. In some embodiments, this is achieved in the following manner:

High resolution images of a wafer at a particular process or design layer are input to the system 402. Input may be done automatically or manually.

At 404, image processing algorithms are applied to each image in order to extract, for example, the contour of the pattern that is visible in the high-resolution image. In some embodiments, the high-resolution image may show patterns from more than one process or design layer, in which case the patterns from each layer appear in different color tones or different shades of gray. Contours for one or more of the layers present in the high-resolution image may therefore be separately extracted from the image by relying upon the different gray scale values or color tones exhibited by each layer.

At 406, another algorithm may be invoked to match, for example, the extracted contours to the reference design (e.g., physical layout). In some embodiments, the contour represents the actual pattern that was printed on the wafer, and the physical layout represents the intended pattern that the designer wanted to print. In some embodiments, the intended pattern includes lines with perfectly straight edges and bends with perfectly defined angles (such as 90-degrees, 45-degrees, etc.). The actual printed pattern, however, may exhibit lines that have rough edges and bends that have corner rounding effects. The contours extracted from real images will therefore also exhibit line edge roughness and corner rounding, which are referred to herein as "jittery" effects. In some embodiments, the algorithm matches (jittery) contours of the actual printed pattern to the (straight edges and sharp corners) of the intended pattern.

At 408, in some embodiments, after the contours from an image have been successfully aligned or matched to the reference design, the matched section of the reference design is searched for the presence of any features of interest. Features of interest include those critical and/or consequential features that might impact or affect yield (e.g., fail during production), or might otherwise be deemed necessary for monitoring. Features of interest may include various types of geometries with certain properties (e.g., certain line widths, minimum spaces, etc.). In some embodiments, defect detection and measurement is then performed on these features of interest. In some embodiments, because pattern tracking over time across multiple lots and wafers may include the analysis of the same or similar patterns over time, the use of rules to carefully select patterns-of-interest improves the chances that the same or similar patterns will be seen by the PCPC system time and time again. These rules may be the same as those used to build the full-chip Pattern Decomposition and Ranking Database 163. Further, not all patterns may be considered to be critical or consequential from a defect or deviation point of view. They may be, for example, dummy or dummy-fill structures that serve no electrical function, and other generally non-weak geometries such as large blocks and particularly wide lines. Cluttering the Pattern Decomposition and Ranking Database with such data entries may result in the inefficient use of finite computational resources, as they may not be critical or consequential from a defect or deviation point of view. In some embodiments, the PCPC technique described herein, therefore, emphasizes the use of rule-based selection criteria to select only features of interest and avoid "noise" (i.e. the non-critical and non-consequential features).

At 410, in some embodiments, the contour of each feature of interest identified by 408 is compared against the intended pattern. At 412 defects such as breaks and bridges are identified and measurements of user-specified elements of each feature of interest are taken. In some embodiments, if the high-resolution image contains patterns from two or more design layers, it is also determined if the printed pattern of each design layer is properly stacked atop the design layer beneath it. These detection and measurement operations may be performed anywhere on the aligned contour (in which case every part of the contour and the matched section of design are considered to be features of interest), and these operations may also be performed on selected locations on the aligned contour.

At 414, in some embodiments, now that some or all high-resolution images have been thoroughly analyzed through, for example, contour extraction, alignment to design, identification of features-of-interest, defect detection, and key element measurement, relevant information may be saved in, for example, a database used to track real silicon (i.e., printed versus simulated) patterns 414 (also referred to herein as the "Real-Silicon Pattern Tracking Database" or "Real-Silicon Pattern Quality Database"). In another embodiment, the same information may be saved directly into the full-chip Pattern Decomposition and Ranking Database 416. In some embodiments, the Real-Silicon Pattern Tracking Database 414 includes only patterns that were extracted from images captured from real (physical) wafers, whereas the Pattern Decomposition and Ranking Database 416 will, from the beginning, include the complete set of constituent patterns for the chip regardless of whether or not those patterns have yet been observed in any actual images. However, as images are captured by the Fab over the course of time, empirical data from those images are extracted using the method of FIG. 4 and inserted into the appropriate parts of the Pattern Decomposition and Ranking Database 416. In various embodiments, the information that is saved into either database 414 or database 416 includes, but is not limited to, the following example information:

The section of the design layout that is centered around each feature-of-interest, with or without a specified extension that allows part of the neighborhood to be included.

The section of the extracted contour that is centered around each feature-of-interest, with or without a specified extension that allows part of the neighborhood to be included.

The full image from which the contour was extracted or the section of the image that is centered around each feature-of-interest, with or without a specified extension that allows part of the neighborhood to be included.

The value(s) of any measurements performed in or around the feature-of-interest.

The detection of any defect in or around the feature-of-interest.

The identity of the Lot, Wafer, Process Step, Design Layer, Microchip Device Name, etc. for which the high-resolution image was taken.

Thus, the empirical data extracted from images include contours of the actual printed pattern, measurements of any part of the contour, measurements of deviations between the contour and the reference design, various types of defects detected on the contour itself or by comparing the contour with its reference design. Comparison of the intended pattern and the contours of the printed pattern is performed to detect any defects or anomalies. Printed patterns will rarely look exactly like intended patterns because while intended patterns may exhibit perfectly straight lines and perfect 90 degree angles, these "pristine" features cannot actually be perfectly printed. The degree of difference or dissimilarity between the intended and printed circuit layout patterns causes yield loss, parametric (or signal) degradation, and delays in the production of devices. In some embodiments, databases 414 and 416 capture and track the fab's ability to print patterns consistently and to print them correctly. In order to accomplish this, in some embodiments, empirical data is extracted and stored for a pattern each time that pattern is found in an image. The same pattern, therefore, can accumulate multiple measurements over time, taken from different parts of the same chip, different parts of the same wafer, from different chips, from different wafers, from different days, and so on. On-going collection of empirical data for those patterns provides the ability to track or monitor patterns. Both databases 414 and 416 are designed to accommodate multiple and ongoing accumulation of empirical data for each pattern.

This analysis of images taken of physical wafers is used to impart the empirical type of ranking (e.g., as shown at column 308 of FIG. 3)—to the unique set of constituent patterns obtained, for example, from the decomposition of the microchip physical layout (e.g., decomposed patterns obtained from layout decomposition, as described above). Over time, as more and more images are collected, trends for patterns of certain types of geometries or shapes can be determined, such as frequency of defectivity or a distortion in the printed shape. For example, one type of shape may have a much higher frequency of defectivity, whereas another type or kind of shape, even though it has a minimum line width and is very thin, does not fail very often. Thus, empirical data can be used to track intended patterns to determine whether they print well or poorly.

As described above, the empirical data extracted from the diagnostics, inspection, or SEM review of physical wafers is used as a source of information to determine and assign fabrication risk assessments to the intended or constituent circuit layout patterns in the Pattern Decomposition and Ranking Database 163. As one example, a constituent pattern may be assigned a fabrication risk assessment on a low risk, medium risk, or high risk scale based on the empirical data collected from SEM images containing the constituent pattern. For example, as described above, the contours of the instances of printed versions of the intended pattern may be extracted and compared against the intended or reference pattern. Based on the comparison, deviations between the printed instances of a pattern and the reference pattern are computed (e.g., by taking measurements of the contours and the reference pattern and determining the deviations—for example, deviations in the critical dimensions of certain features). The risk of defectivity (fabrication risk assessment) for the reference pattern may be determined based on the amount of deviation measured between the intended patterns and the instances of the printed patterns. As one example, each instance of a printed pattern is determined as being good, weak, or defective by determining the amount of deviation of that instance of the printed pattern to the intended pattern. Based on the good, weak, and bad classifications of the multiple printed instances of the pattern, a fabrication risk assessment may be determined. As one example, if there are four printed instances of a constituent layout pattern, and all are good, then the constituent layout pattern is classified or assessed as having a low failure risk. If, on the other hand, one or more of the printed instances were found to be weak, then the constituent layout pattern is assessed as having a medium failure risk. If one or more of the printed instances were found to be bad, then the constituent layout pattern is assessed as having a high failure risk. As more SEM images that contain the constituent pattern are collected, the real silicon score or empirical data score based on high resolution images may be updated.

In some embodiments, instead of, and/or using low, medium, high risk fabrication risk assessments, the intended pattern is labeled as good, weak, or bad based on the degree of deviation between the intended pattern and the printed instances of the intended pattern. In other embodiments, instead of, and/or using low, medium, high risk fabrication risk assessments, the intended pattern is assigned a numeric score on a suitable numeric range.

Increasing Coverage of Empirical Data-Based Fabrication Risk Assessments

One example practical challenge with the collection of empirical data from real printed/fabricated wafers is that the coverage may be relatively low or sparse. For example, the set of high-resolution images generated by SEM, eBeam, and any other similar tool may not cover the entire diverse set of patterns that are printed on the wafer (resulting, for example, in the gaps shown at column 308 of FIG. 3, such as gap 310). For example, because SEM imaging is relatively slow, fabs cannot afford to take images of every detected defect (e.g., defect reported by the faster optical wafer inspection tools that may be run on the wafer first) in a production environment (due to the large amount of inventory being produced). For example, consider that the set of unique constituent patterns obtained through decomposition of the microchip physical layout file may number in the tens of millions, but in a typical fab, only a small number of SEM images (e.g., 200-500) may be taken on standard wafers as opposed to special-purpose wafers such as those designed to optimize the focus and exposure conditions of a lithography tool. Even on special-purpose wafers, the number of SEM images may be limited to a few thousand, which still results in a relatively small coverage area because typical SEM images cover an area of about 2 microns by 2 microns or less. But typical wafers are 300 millimeters in diameter, which is 300,000 microns. The area of the wafer (pi times the radius squared) is approximately 70.7 billion square microns. However, 10,000 SEM images, each covering an area of 2 um by 2 um, would only cover 40,000 square microns. Thus, the number of unique patterns present in this set of images may fall far short of the tens of millions needed for a full empirical ranking. Numerous wafers may be imaged, for example, every hour, and the number of images taken over the course of a single day may exceed, for example, 150,000. This improves overall coverage, and the situation may continue to improve every day as more and more images are taken and subsequently processed in accordance with the PCPC technique described herein. However, there may continue to be a significant shortfall in coverage.

In some embodiments, to address such a shortfall with high resolution imaging (which is the most reliable of ranking sources but provides the least coverage), Machine Learning techniques (e.g., support vector machines (SVM), K-nearest neighbor, convolutional neural networks, deep learning networks, etc.) are employed to fill in the gaps in those patterns that do not have real silicon data. For example, as shown in the "Actual Printed Patterns" column 308 of the example of FIG. 3, empirical data from real or printed or fabricated silicon may be incomplete—many of the unique constituent patterns may have no ranking information from real silicon because those patterns have not been observed in any of the high-resolution images that were examined. However, there may be real silicon data for a number of other constituent patterns. Some of these constituent patterns may be assigned a low risk ranking (example of a fabrication risk assessment) on the basis of empirical data, while others may be assigned a medium and high risk ranking. In some embodiments, by using machine learning, some or all of the high risk patterns are examined, and a determination is made of what makes them different, for example, from the medium and low risk patterns. In some embodiments, both the high and medium risk patterns are examined, and a determination is made of what makes them different from only the low risk patterns.

Figure 5:
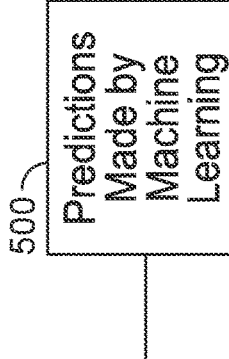
FIG. 5 illustrates an example embodiment of an example application of machine learning to make a prediction about patterns.

In some embodiments, if certain attributes about the patterns are usable to successfully segment them into low and high risk categories, for example, then those attributes may be applied to the remaining constituent patterns that lack an empirical rank. In some embodiments, the machine learning algorithm makes a prediction about each of these remaining patterns. In some embodiments, the prediction may include an indication of weakness (e.g., "weak" or "not-weak"), or it may be more complex and predict degree of weakness as well. An example of this type of prediction is illustrated in the example of FIG. 5. The reliability of the machine learning algorithm's predictions may also be assessed.

FIG. 5 illustrates an example embodiment of an example application of machine learning to make a prediction about patterns. Continuing with the example of FIG. 3, there are some unique constituent patterns in the Pattern Decomposition and Ranking Database 163 that lack an empirical rank. As described above, for the patterns that lack an empirical rank, machine learning is used to make a prediction about each of these patterns 500. As shown in this example, and as described above, rather than assigning a rank of low, medium, or high as with those unique patterns for which there is empirical data, the predictions are scored on a different scale of weak or not weak based on a binary assessment or classification based on the machine learning.

Machine learning may be a dynamic and ongoing process. For example, as more real (empirical) data is received by the machine learning algorithm, the algorithm may re-tune itself to make improved predictions. As such, in some embodiments, the entire set of machine learning predictions shown in the example of FIG. 5 may be revised or updated on an ongoing basis.

In some embodiments, the machine learning described above is not performed until a minimum number of constituent patterns have corresponding imaging information (e.g., to form a training set), or a minimum number of images (e.g., SEM images) have been collected.

The following is an example embodiment of improving coverage of the empirical ranking source (i.e., high resolution images) that uses the Support Vector Machine (SVM) machine learning algorithm. In some embodiments, the machine learning described herein is carried out using machine learning models 172 of system 150.

First, the intended or reference circuit layout patterns for which there are corresponding real silicon empirical data obtained from SEM images (or any other collected high-resolution images that include the intended or reference pattern) are used to classify the pattern as good or bad. The classification may be based on the deviation computed between the measurements of the printed instances of the intended pattern and the dimensions of the intended pattern itself.

The intended patterns that are classified as good and the intended patterns that are classified as bad are separated. In some embodiments, feature extraction is performed on each of the good and bad groupings of reference patterns. For example, for the set of good patterns, certain geometric properties of the reference patterns are extracted or otherwise determined. The set of these geometric properties for each pattern is herein referred to as a "feature vector." Thus, a feature vector (consisting of a set of geometric properties) for each "good" reference pattern is extracted. Similarly, certain geometric properties of the reference patterns classified as bad are computed, and a feature vector (of geometric properties) for each "bad" pattern is obtained. Examples of such geometric features include, but are not limited to, pattern density, directionality, pattern complexity in the x-axis, pattern complexity in the y-axis, etc. In some embodiments, the feature vectors include or are generated based on the other rankings, such as the design signatures generated for a pattern, as well as its OPC simulation score.

Suppose that there are N features in the feature vector extracted for a pattern (whether good or bad). All feature vectors, for both good and bad patterns, are plotted in N-dimensional space. The support vector machine algorithm then attempts to find clusters of good patterns in this space, and clusters of bad patterns in this space. The algorithm may use any combination of the discrete features in the feature vectors in its attempt to find clusters of good patterns that are spatially separated from the clusters of bad patterns in the multi-dimensional space (which may be less than N dimensions if not all N features in the feature vector are deemed necessary by the algorithm).

If it is then determined by the support vector machine algorithm that the clusters of good feature vectors and the clusters of bad feature vectors are suitably or sufficiently distinct, then the algorithm has succeeded in creating a viable prediction model. However, if the clusters of good feature vectors significantly overlap or intersect the clusters of bad feature vectors, then the support vector machine algorithm concludes that a viable prediction model cannot be formed. In this case, more empirical data may be needed, or new types of features may be required. Stated another way, the amount of overlap between the good and bad clusters of feature vectors is determined based on the boundaries of the clusters. If there is little overlap between the clusters, then the features extracted from the patterns were well chosen features, providing the ability to resolve good reference patterns from bad reference patterns. On the other hand, if the clusters overlap to a large degree, then the extracted features and properties used to cluster the patterns do not have sufficient resolution to separate or distinguish between good and bad patterns.

Suppose that there is significant overlap between the good and bad clusters, which indicates that the features selected to be extracted from reference patterns are unable to be used to resolve or predict whether the reference pattern will be a good or bad pattern. The machine learning algorithm then iterates by selectively discarding one or more discrete features from the feature vector until sufficiently distinct clusters of good and bad patterns emerge. However, if sufficiently distinct clusters of good and bad feature vectors cannot be obtained, then no prediction can be made, and the machine learning algorithm may return a result of "inconclusive" or any other appropriate response Once suitably distinct clusters of good and bad feature vectors are computed, the clusters are used as a binary classifier to predict whether reference patterns, for which there is no real silicon empirical data, are expected to be good or bad patterns based on their extracted feature vectors and in which cluster those extracted feature vectors land or intersect). For example, for an unassigned pattern (a reference pattern not having empirical data from SEM images), the same properties are extracted from that pattern as were used to determine the clusters of good/bad feature vectors. If the extracted feature vector for the unassigned reference pattern is closest to the clusters of good feature vectors, then the pattern is predicted to be a good pattern. If the extracted features for the unassigned pattern is closest to the clusters of bad feature vectors, then the pattern is predicted to be a bad pattern (or a weak pattern). In another embodiment, once the clusters of good and bad patterns have been formed and applied to the feature vectors of all unassigned patterns, those unassigned patterns that are proximate the clusters of bad patterns are predicted to be weak, and all others are predicted to be not-weak. This embodiment avoids predicting good patterns because once such a prediction is made, it is possible that such patterns will not be scrutinized or monitored, in which case a faulty prediction of 'good' would suppress the detection of a bad pattern. Hence, labeling patterns as 'not-weak' means that the pattern may be good or it may be bad, but that the prediction model did not have sufficient cause to label it as a weak pattern. Thus, existing empirical data may be used to make predictions of fabrication risk assessments for those constituent patterns in the Pattern Decomposition and Ranking Database 163 for which no corresponding empirical data has yet been collected.

As described above, the machine learning process is an ongoing and dynamic process, which improves as more data (e.g., SEM images) is collected. This allows the clusters of good and bad feature vectors used to perform the binary classification to be recomputed and iteratively improved over time.

Fabrication Risk Assessments Based on Wafer Inspection Tools

As described above, high speed wafer inspection tools (such as optical inspection tools and laser scatter inspection tools) are in some embodiments used as a first step in the overall process of capturing high resolution images of specific defect locations. For example, the high-speed wafer inspection tools may be first used to quickly identify defect locations, a subset of which are then visited by high resolution imaging tools (e.g., SEM or eBeam tools) to capture images, which may in turn be used, as described above, to provide empirical data-based rankings of unique constituent patterns. In some embodiments, the data from high speed wafer inspection tools may also be used as sources of information for ranking the decomposed circuit layout patterns. These tools have lower resolution than SEM/eBeam tools, which may render the rankings based on them less reliable, but they operate faster and have better coverage.

As one example, suppose that information from an optical inspection tool is used. The optical inspection tool scans a large percentage of the full wafer (with all the die and chips on the wafer) and attempts to identify defects on the wafer. However, while the optical inspection tool is very fast, it has low resolution relative to high resolution imaging tools such as SEM (e.g., the smallest feature the optical inspection tool can clearly resolve is significantly larger than the typical size features that are printed in leading-edge Fabs today). While the images taken from the optical inspection tool may be low resolution and blurry, they may still be used to find high contrast defects (e.g., while the background of the image may be a dark shade of grey, the defect may appear to be a noticeably lighter shade of gray, thus exhibiting a clear contrast difference). So while the wafer inspection tool cannot see the defect clearly, it can detect a high contrast difference that should not normally be present.

The following is an example of using the information from the wafer inspection tool as a source of information for ranking intended or decomposed circuit layout patterns. The wafer inspection tool reports the coordinates (e.g., (X,Y) coordinates) of a detected defect. The reported coordinates are located on the layout of the semiconductor chip (e.g., by applying a coordinate transformation formula that can transform wafer coordinates as reported by inspection tools into coordinates within the circuit layout file). A section of the design pattern surrounding the coordinates of the defect is lifted from the layout. In some embodiments, the portion of the layout that is lifted depends on the coordinate accuracy of the wafer inspection tool. For example, suppose that the coordinate accuracy of the wafer inspection tool is 50 nm. Then the portion of the layout that is lifted is the box that has a square radius of 50 nm from the reported X,Y coordinates, resulting in a 100 nm×100 nm section of the layout centered on the reported defect coordinate. In another embodiment, the portion of the layout that is lifted is the box that is centered on the reported X,Y coordinate, but has a square radius equal to the sum of the reported defect size (or any other adjustment factor) and the coordinate accuracy specification of the wafer inspection tool.

Patterns-of-interest are then identified within the lifted section of the layout (e.g., using the geometric heuristic rules used in the layout decomposition described above). There may be numerous patterns-of-interest within the lifted section of the layout. Because the accuracy of the tool is such that the exact feature or pattern containing the defect cannot be identified directly (i.e., from coordinates alone), in some embodiments, all of the patterns in the lifted section of the layout are assigned the same fabrication risk assessment. For example, for each pattern-of-interest found in the lifted section of the layout, a record is made that there was an instance of a defect upon or proximate the pattern-of-interest (i.e., the defect detected by the wafer inspection tool correlates to every one of the patterns-of-interest that happen to be in the lifted section of the layout).

Thus, while the coverage of the wafer inspection tool is relatively good, the exact pattern containing the defect cannot be identified on the basis of the reported coordinate because of inherent mechanical imprecision. In this case, there is low correlation accuracy in that the defect cannot be correlated precisely to a specific pattern.

The following is an example of scoring based on wafer inspection tools. Suppose that the fabrication risk assessment is a score predicting the likelihood that a given pattern will fail when printed. In this example, the score is on a sliding scale of 0-100, with 0 indicating a zero percent probability of failure, and 100 indicating a one hundred percent probability of failure. Suppose that based on wafer inspection results, on a single die, a particular pattern-ofinterest is found five times in regions identified as having defects. Suppose, in this example, that there were 100 instances of that particular pattern scattered on the chip (which can be counted based on the decomposition of the layout). Thus, based on empirical data from wafer inspection, a wafer inspection fabrication risk assessment score or rank of 5 can be assigned, attributed, or otherwise associated with the particular pattern (indicating, for example, a failure rate of 5%). In another example, the fabrication risk assessment from wafer inspection tools can be calculated by taking the number of times a pattern-of-interest was found to be weak or defective in a set of images and dividing it by the total number of times that pattern-of-interest was found within the same set of images.

Fabrication Risk Assessments Based on Electrical Test and Failure Analysis

While electrical tests and failure analysis are highly reliable or accurate sources for ranking decomposed circuit layout patterns, because they are performed at the very end of the manufacturing cycle (i.e., after a wafer has completed its manufacturing process), the information they provide is less timely, which means that a large number of wafers currently in the production line, especially at the middle to late stages of manufacture, may have been exposed to the root cause of any problem discovered by the electrical test and failure analysis operations. While it would be beneficial to diagnose problems as early in the manufacturing process as possible in order to minimize exposure to risk and to administer corrective or remedial actions quickly, nevertheless, some types of problems may only be caught by electrical tests or failure analysis methods. This is in contrast to the real silicon contours (e.g., contours extracted from SEM and eBeam high resolution images, as described above), which are both highly accurate and are also performed early and frequently throughout the production cycle.

For example, after the chip is fabricated, electrical functionality testing is performed on the fabricated chip, which tests whether the chip performs internal computations correctly based on a set of input conditions and returns the correct output results. Suppose that during the electrical or functional test, a number of problems are discovered. Various techniques are applied by the testing department in the Fab to identify the root cause of the problems and even to localize the problem to specific parts of the circuit layout. Although the wafer is already fabricated and cannot be corrected at this point, the information obtained from electrical test and failure analysis has high value to the subsequent material being fabricated (e.g., next wafer that is coming down the production line).

The coverage of electrical tests is relatively high. Although not every transistor can be turned on and off individually to test its functionality, various testing methodologies are utilized to provide the best test coverage in the least amount of testing time (due to cycle time constraints). The reliability of the electrical test and failure analysis information as a source of fabrication risk assessments is very high, it is empirical, and provides information about actual failures on actual devices.

Failure Analysis (or simply FA) is different from electrical testing. Failure Analysis (FA) is the process of tracing a set of carefully chosen electrical failures to root cause, most often through physical inspection techniques and even physical deconstruction techniques (such as strip back) in order to identify the physical failure mechanisms. FA can be performed at the end of line when wafers have been electrically (functionally) tested. However, instead of waiting for wafers to be fully manufactured before electrical testing and FA can begin, a Fab may use "short loop" wafers that print simplified circuit design layouts. Whereas normal circuit design layouts may consist of 5, 10, or more interconnect layers (to wire all the transistors, resistors, capacitors, and other discrete components together), short loop wafers may only contain 1 or 2 interconnect layers. Short loop wafers can therefore be manufactured quickly and become available quickly for both electrical testing and FA.

One example of scoring or ranking intended circuit layout patterns using information from electrical test and failure analysis is as follows. The electrical (functional) failures are reported in "schematic" coordinates rather than physical (x,y) locations. These schematic coordinates are translated or otherwise mapped into physical coordinates or, more frequently, into a set of physical regions on the design layout (for example, through logic bitmapping). The patterns in the design layout at the translated coordinates or regions are assigned a value indicating that a defect (electrical or functional defect, in this case) occurred on or near that pattern. For example, advanced electrical/functional testing tools such as ATPG (Automated Test Program Generation) tools can be used for electrical (functional) testing and for subsequent logic bitmapping. A large, but carefully considered set of zero and one binary sequences is applied to the chip. Each binary sequence is known as a Test Vector, and may consist of tens or hundreds of binary digits. Each test vector is typically designed to exercise some particular circuit elements. When all test vectors have been applied, and all test results have been obtained, the electrical testing tool can assemble a list of all the electrical faults, then attempt to localize each fault to a specific physical region of the chip's physical design layout (logic bitmapping). In this manner, electrical faults can be mapped to physical regions within the design layout, thereby allowing the patterns-of-interest within those physical regions to be extracted and assigned a rank.

Thus, in some embodiments, for each type of data source (e.g., empirical, statistical, simulated, as described above), there is a corresponding individual score assigned to a constituent circuit layout pattern (i.e., for every constituent circuit layout pattern in the Pattern Decomposition and Ranking Database 163, each source provides its own fabrication risk assessment for that pattern). In some embodiments, the individual scores may be rolled up or aggregated into a single, overall score for the constituent pattern. For example, users may define various rollup formulas to aggregate the distinct scores from the distinct sources into a single overall score. For example, a user may define an aggregation formula that weights the sources differently, giving less weight to simulation-based scores such as those from OPC simulation, and more weight to empirical-based scores such as those from silicon contours (e.g., obtained from SEM images) and electrical tests. Various statistical techniques may also be applied in a user-specified formula to roll up the individual source scores.

Process Control Using the Pattern Ranking Information

After the decomposed patterns of the Pattern Decomposition and Ranking Database 163 are scored, various applications may be realized using the information in the Pattern Decomposition and Ranking Database, examples of which are described in further detail below.

Driving Inspection and Metrology Tools—Local Area SEM and eBeam Inspection

In some embodiments, the use of high-resolution SEM images described in the previous section relied upon high speed wafer inspection tools (such as optical inspection tools and laser scatter inspection tools) to first find locations of probable defects. SEM images were then taken, for example, on a subset of these locations. The effectiveness of this SEM review method relies on the effectiveness of the wafer inspection tool and the recipe that was used to configure and operate that tool. For example, optical and laser scatter tools may be unable to detect certain types of defects, such as particularly small defects, low-contrast defects, and defects that occur on both the current die and its neighboring dies on the wafer. Although such tools may have the benefit of high speed, they have the disadvantage of, for example, lower sensitivity to defects as compared to tools such as SEM and eBeam tools. To the extent that sensitivity to defects is dependent upon image resolution, SEM and eBeam tools may continue to outperform optical and laser scatter tools in this regard (i.e., high resolution imaging tools such as SEM and eBeam produce fabrication risk assessments that are of higher reliability than fabrication risk assessments made from lower resolution inspection tools such as optical and laser scatter tools).

However, SEM and eBeam tools typically operate at much slower speeds and emit much higher energies onto the wafer surface, and thus, there may be tradeoffs involved in either case. For example, while SEM and eBeam tools may provide higher quality of information than high speed wafer inspection tools, they have lower coverage, because the slower speed of SEM and eBeam tools may only allow enough time to cover small portions of the semiconductor chip In some embodiments, because the PCPC technique described herein may decompose a microchip physical layout into a set of unique constituent patterns and rank the criticality of those patterns, the database of constituent patterns may be queried for a list of most critical ones. An SEM or eBeam tool (or any other tool, as appropriate) may then be programmed to visit, for example, a representative subset (or sample) of these critical patterns on one or more die on one or more wafers (e.g., as shown at 104 of FIG. 1A). For example, inspection and metrology tools may be automatically programmed (e.g., via systems integration or linking of such inspection and metrology tools with system 150 via the Analytical and Output Engine 164) to visit the sites of patterns that are determined to be most likely to fail based on the fabrication risk assessments. The images collected from these visits may then be analyzed using the same empirical ranking techniques as described in the previous section related to 103 of FIG. 1A. This provides more efficient utilization of imaging tools such as SEM review tools, as the imaging is targeted to specific high risk areas of the wafer.

Additionally, in some embodiments, certain specific sites may be repeatedly visited in use cases such as Edge Placement Error (EPE) measurement and Critical Dimension Uniformity (CDU) tracking. EPE, CDU, and other "metrology" operations often require the same pattern to be measured repeatedly on the same die, the same wafer, and on other wafers in order to track the pattern's spatial and temporal behavior more effectively. This may include specifying (and standardizing) the locations of all sites to be visited and imaged by the SEM or eBeam tool.

Figure 6:
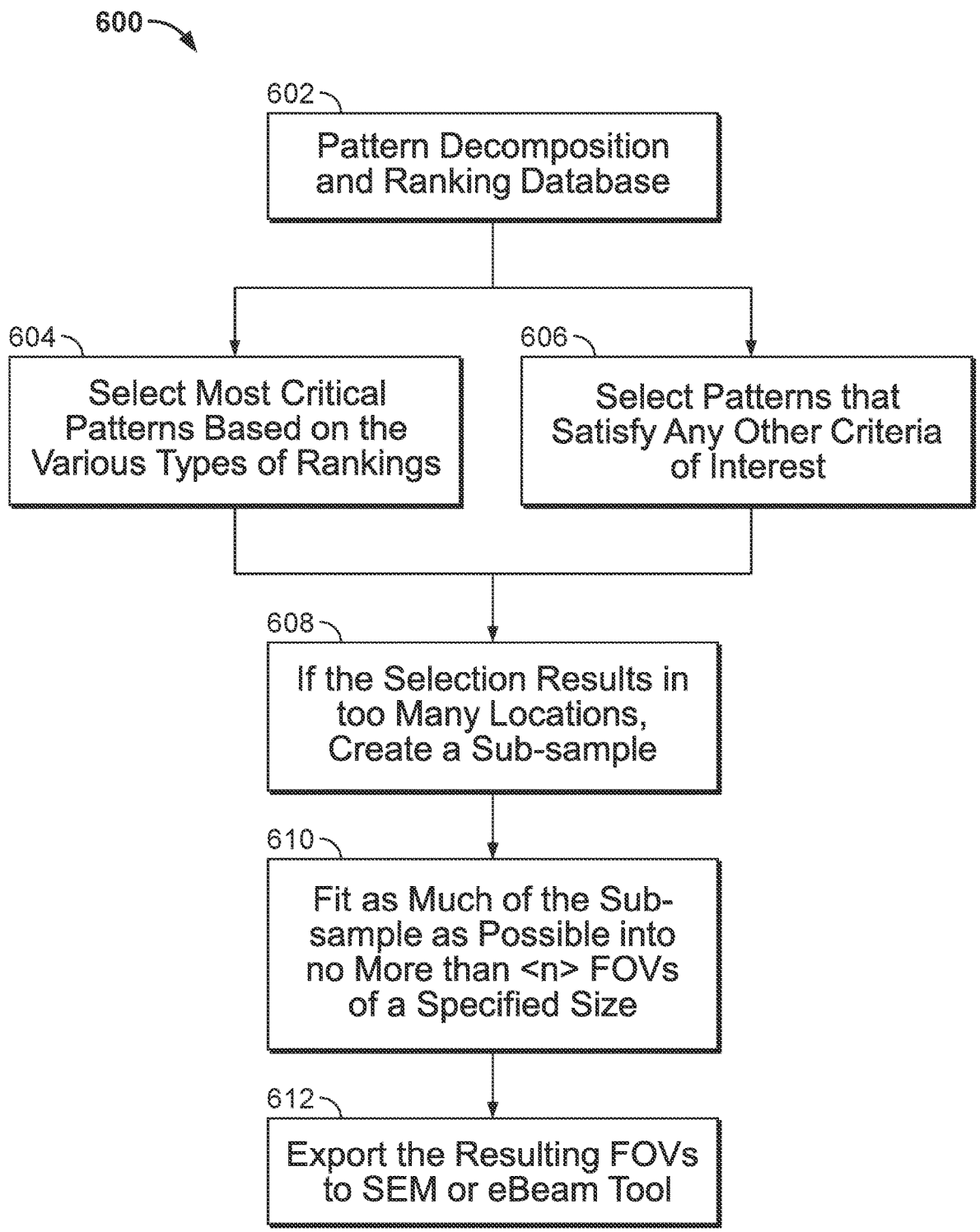
FIG. 6 illustrates an example embodiment of creating optimized Fields of Views (FOVs).

In some embodiments, in order to drive an SEM or eBeam inspection tool efficiently—e.g., to visit the most sites using the fewest images—the selection of those sites is optimized, for example, as illustrated in FIG. 6.

FIG. 6 illustrates an example embodiment of creating optimized Fields of View (FOVs) for tools such as SEM and eBeam. An eBeam inspection tool may use relatively large Fields of View (FOV), for example, 20×20 micron or larger. Because the number of locations to be inspected and/or imaged is proportional to the amount of time the wafer is tied up on the SEM or eBeam tool, the primary challenge is to fit the maximum number of sites-of-interest within a minimum number of FOVs. In some embodiments, the limit on the number of FOVs may be governed by the amount of time available or allocated for the job. In some embodiments, this is referred to as the "FOV Optimization Problem." In some embodiments, the PCPC technique described herein implements FOV Optimization.

In some embodiments, process 600 of FIG. 6 is executed by the Analytical and Output Engine 164. At 602, a set of unique constituent patterns and their rankings are received (e.g., by accessing the Pattern Decomposition and Ranking Database 163).

At 604, the most critical patterns are selected (from those received at 602) based on the various types of rankings. At 606, patterns (from those received at 602) that satisfy any other criteria of interest are selected (e.g., a small random set of less critical patterns that should be imaged to prove that they are in fact less critical).

At 608, if the selection or sample plan produces too many locations (e.g., exceeding a threshold), a sub-sample of patterns is created. At 610, as much of the sub-sample as possible is fitted into no more than N FOVs of a specified size.

At 612, a list of the resulting FOVs is exported to an inspection and/or imaging tool such as an SEM or eBeam tool.

Thus, using a ranked database of patterns, as described herein, facilitates improvements in the efficiency and effectiveness of inspection and metrology tools, as well as SEM review time in a fabrication context (which has numerous time constraints), by focusing the monitoring, inspection, and imaging of the fabrication process (e.g., wafers) on portions (e.g., locations of patterns) of a semiconductor chip that are problematic or have the highest likelihood of failure (e.g., based on ranking/scoring of the patterns using the techniques described above). Further, the ranking or identification of patterns as bad may be used to drive inspection and metrology of future wafers.

Determining Process Marginalities and Design Marginalities

Using the Pattern Decomposition and Ranking Database described herein, the criticality or risk of fabrication failure of the patterns of a chip's physical layout are assessed. For those patterns where issues or defects are identified, a first step in root cause analysis is to determine if the problem is most likely due to a process marginality or a design marginality. Different corrective actions are taken for each of these types of marginalities.

For example, when an intended or reference pattern is identified as being a bad pattern (e.g., one that is more likely to suffer from defects or cause yield issues), one example next step to perform is to determine whether the "bad" pattern is the result of a design marginality or a process marginality. If the problem with the pattern is due to a process marginality, then fixes or modifications may need to be made to various process tool operational recipes (e.g., etch recipe, chemical vapor deposition [CVD] recipe, physical vapor deposition [PVD] recipe, etc.) or to a process tool's hardware itself (e.g., undertake a preventive maintenance operation, make repairs to the hardware, adjust or fix problems with gases and chemicals entering and/or exiting the tool, etc.). If the issue with the pattern is due to a design marginality, then revisions may need to be made to the design layout patterns that are printed on the reticle (i.e., mask revision), such as changes to OPC decoration or changes to the physical layout itself. (The reticle or mask can be thought of as the master template. The patterns to be printed on the wafer are etched into the surface of the reticle or mask to create a reference 'printing plate.' The pattern on the printing plate—formally known as the mask or the reticle—is replicated onto the surface of every wafer. A problem on the mask or reticle therefore impacts all wafers that were printed with that mask or reticle.)

The Pattern Decomposition and Ranking Database may be used to track the effectiveness of process and mask revisions. For example, for a pattern that is verified as being problematic, a reassessment of the pattern can be made after a process or design revision (e.g., using empirical data ranking) to determine if the pattern fabrication risk has improved. Further, because revisions to process recipes act globally on all patterns, rather than locally on specific patterns, the fabrication risk assessments for the decomposed patterns may be monitored to determine their fabrication risk assessments before and after the modification. Similarly, the impact (e.g., net positive or net negative) to the defectivity of patterns in the chip design may be monitored after mask revisions. Thus, changes to the fabrication performance of the decomposed patterns of the semiconductor chip can be tracked before and after process and/or mask revisions to determine the impact of those revisions on the decomposed patterns. In some embodiments, such information (e.g., the risk assessments for patterns before and after revision dates) may be presented via a flexible graphical user interface (GUI), where the user may query the Pattern Decomposition and Ranking Database 163 for the top N best patterns and the top M worst patterns after a mask revision, before a mask revision, after a process revision, before a process revision; the most stable patterns (e.g., the patterns that have not changed after any revision), the least stable patterns (e.g., the patterns that changed significantly after revisions and are therefore the most sensitive to revisions), etc.

Hotspot Pattern Library

Figure 7:
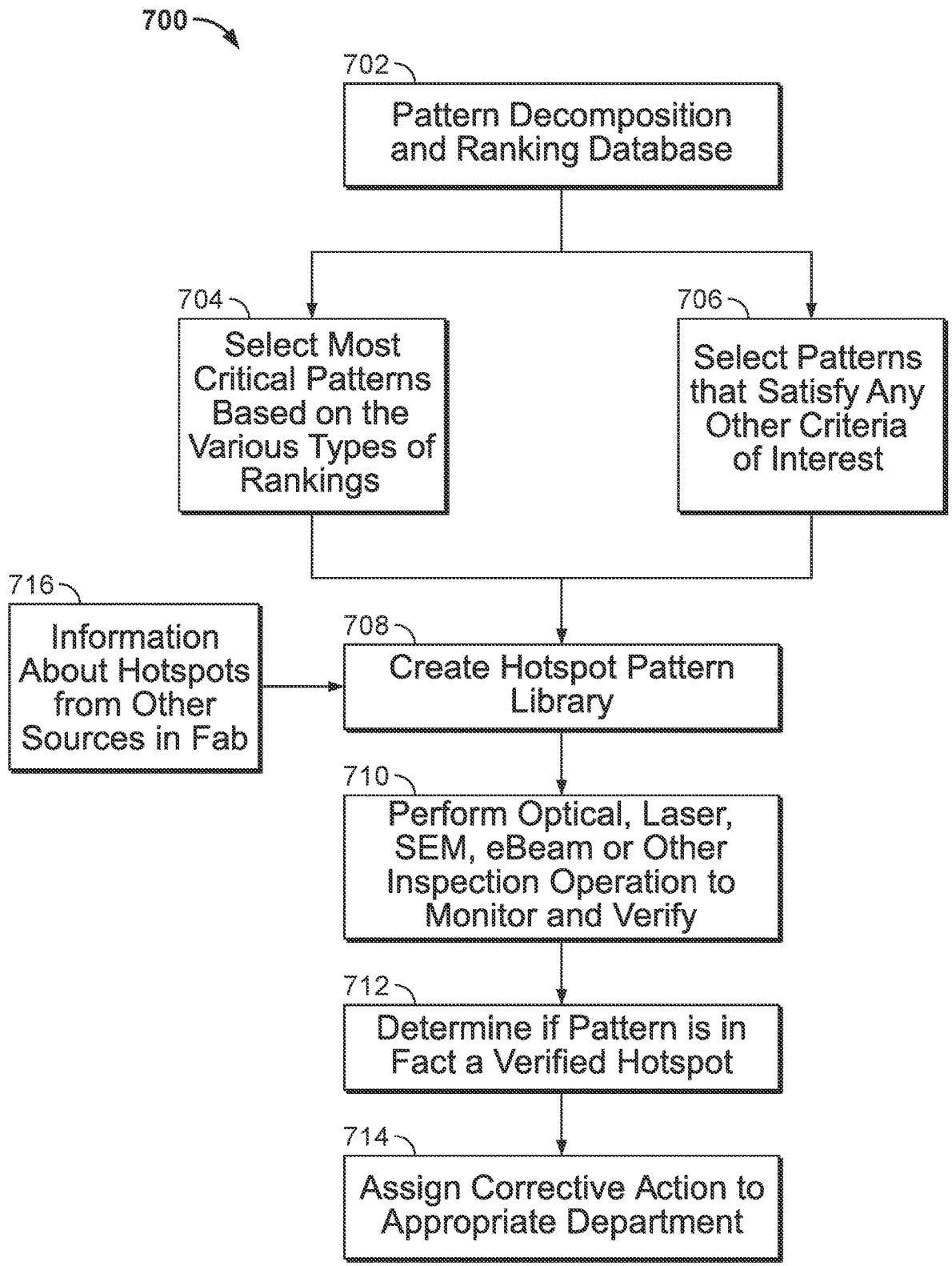
FIG. 7 illustrates an embodiment of a hotspot pattern library.

In some embodiments, the set of unique constituent patterns and their rankings allow for the querying of the most critical patterns, which may, in some embodiments, be imported into, for example, a Hotspot Pattern Library as illustrated in FIG. 7.

FIG. 7 illustrates an example embodiment of a process for generating a hotspot pattern library. In various embodiments, optical, laser, SEM, and eBeam inspection tools may be used to monitor and verify the ongoing printability of the hotspot patterns. In some embodiments, direct corrective action may be taken by various teams in the fab, such as, for example, the OPC team and Process teams. In some embodiments, once a hotspot pattern has been identified, corrective action can be assigned to any appropriate department.

In some embodiments process 700 is executed by Analytical and Output engine 164 of system 150. The process begins at 702, when a set of unique constituent patterns and their rankings are received (e.g., by accessing Pattern Decomposition and Ranking Database 154). At 704, the most critical patterns are selected (from those received at 702) based on the various types or sources of rankings. At 706, patterns (from those received at 702) that satisfy any other criteria of interest are also selected; for example, a small random set of less critical patterns may also be selected because the fab wishes to keep a focus on them as well. At 708, a hotspot pattern library is created using the patterns selected at 704 and 706. At 710, monitoring and verification of the patterns in the hotspot pattern library created at 708 are performed. In various embodiments, the monitoring and verification are performed using optical, laser, SEM, eBeam, or any other appropriate inspection operation. At 712, based on the processing performed at 710, it is determined if a pattern in the hotspot pattern library is in fact a verified hotspot. At 714, corrective action is assigned to any appropriate department.

In some embodiments, hotspot patterns may be identified by the fab using other techniques, and these hotspot patterns may be imported at 716 into the Hotspot Pattern Library, where they may be subject to the same follow-up inspection and corrective operations.

In-Wafer OPC Verification

In some embodiments, typical fabs employ a lithography modeling technique known as Optical Proximity Correction simulation or "OPC simulation." This technique may use only the physical layout of the microchip (e.g., data contained within the GDS/OASIS file) and a model of the lithography and/or etch process to create an artificial rendition of the printed wafer. In some embodiments, the physical layout of the microchip first undergoes some modification before the layout can be used for OPC simulation. These modifications are referred to, in some embodiments, as OPC decorations, and may involve careful, methodic alterations to the patterns. For example, consider an L-shape pattern. It may be the case that upon printing, the inner corners of the pattern become exaggerated, while the outer corners become condensed. To compensate for these physical printing effects, the layout pattern is modified (decorated) (e.g., by ballooning the corners that will shrink during printing, and shrinking the corners that will balloon during printing) so that the printed pattern will more closely resemble the intended pattern.

In some embodiments, once the OPC simulation is complete, the artificial rendition may then be compared against the original (e.g., un-decorated) physical layout to detect discrepancies and flag weak patterns, hotspots, and other anomalies. The simulation model, however, may not be 100% accurate, which may result in the reporting of false errors (alpha risk) and in the omission of real errors (beta risk).

In some embodiments, the results of OPC simulation are therefore subject to verification using actual printed wafers (e.g., product wafers, test wafers, etc.). Typically, OPC verification has been a tedious and manual process. In some embodiments, the PCPC technique described herein may be used to automate this task. The OPC verification may be used to further improve the accuracy of the OPC simulation model.

In various embodiments, the PCPC technique described herein encompasses at least the following example applications of In-Wafer OPC Verification:

Checking OPC Simulation Accuracy Using Actual Printed Wafers

Figure 8:
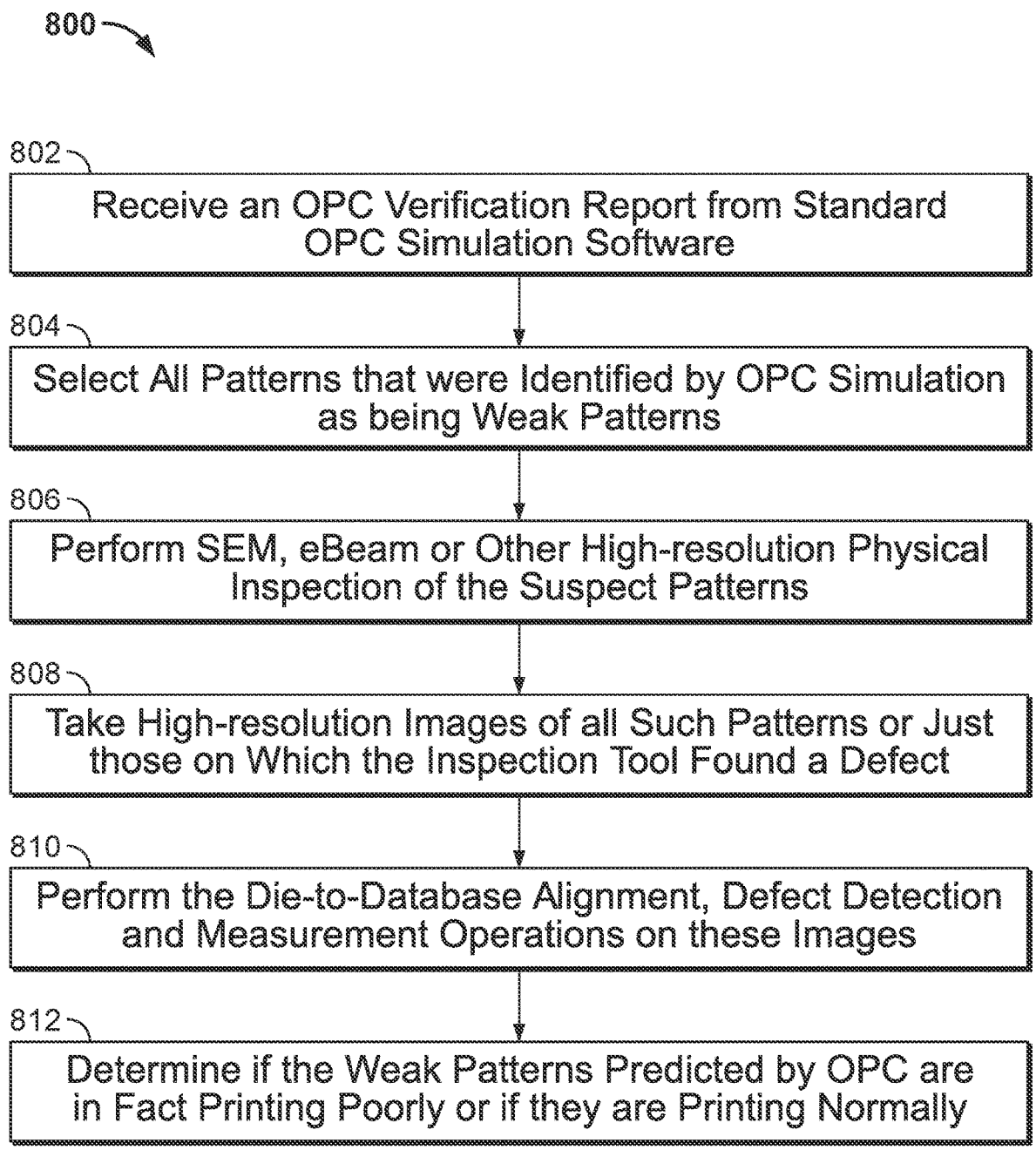
FIG. 8 illustrates an example embodiment of a process for in-wafer OPC verification.

FIG. 8 illustrates an example embodiment of a process for in-wafer OPC verification. In some embodiments, the process includes selecting weak patterns identified, for example, by the fab's standard OPC simulation software. In some embodiments, the locations of these weak patterns are provided to an SEM, eBeam, or any other high-resolution imaging or inspection tool, which inspects one or more real printed wafers at these locations and captures high resolution images. The images may be received by the PCPC technique described herein and subjected, in various embodiments, to contour extraction, die-to-database alignment, defect detection, and measurement operations as previously illustrated, for example, in FIG. 4. In some embodiments, the actual printed pattern is compared with the simulated (OPC) pattern to effect in-wafer OPC verification. Based on the comparison, the accuracy of the OPC simulation may be determined (e.g., by comparing measurements of the simulated contours of a pattern with measurements of the actual printed contours). In some embodiments, if the number of weak patterns predicted by OPC simulation is very large, as may be the case in most instances, the use of such processing may make it practical to perform this type of verification on hundreds of thousands (or more) of suspected weak patterns.

An alternative example approach is to use, for example, an optical or laser inspection tool that may lack high-resolution imaging capabilities but is able to perform defect detection at a relatively fast rate. In some embodiments, the locations of suspected weak patterns may be sent to such an inspection tool, which will perform the inspection on real printed/fabricated wafers and report, for example, only those locations that contain a defect (e.g., that the tool is capable of detecting). In some embodiments, these defect-carrying locations may subsequently be imaged using a high-resolution imaging tool such as an SEM. The resulting images may then be processed using the PCPC technique described herein, which may compare, for example, the actual printed pattern with the simulated (OPC) pattern to effect in-wafer OPC verification.

As another example of checking OPC simulation accuracy, the OPC verification report resulting from OPC simulation is directly compared with the empirical rankings of constituent patterns in the Pattern Decomposition and Ranking Database 163.

In some embodiments, process 800 of FIG. 8 is executed by the Analytical and Output Engine 164 of system 150. The process begins at 802, when an OPC verification report is received from OPC simulation. At 804, all patterns that were identified by OPC simulation as being weak patterns are selected. At 806, high resolution physical inspection (e.g., SEM, eBeam, etc.) of the suspect patterns (identified at 804) is performed. At 808, high resolution images are taken of the suspect patterns, or those on which the inspection tool found a defect. At 810, die-to-database alignment, defect detection, and measurement operations are performed on the images taken at 808. In some embodiments, step 810 is performed by executing steps 402-412 of process 400 of FIG. 4. At 812, it is determined if the weak patterns are in fact printing poorly, or if they are printing normally.

In some embodiments, the OPC simulation scores may be compared with the empirical data scores/fabrication risk assessments to determine the accuracy of the OPC simulation (i.e., how closely did the OPC simulation compare to the actual or empirical result in predicting fabrication failure for various patterns). The accuracy of the OPC model may then be assessed and improved by performing benchmarks against empirical data. This is an example of feedback from empirical data to improve simulation.

Checking OPC Uniformity and Robustness

Patterns in a microchip physical layout may not all be different from each other, but instead many patterns may appear repeatedly in different locations, and the neighboring patterns in each such location may or may not be the same. How any pattern actually prints on the wafer may be influenced not only by the geometry of the pattern itself, but also to various degrees by the geometry and distribution of patterns in its immediate neighborhood. In some embodiments, the PCPC technique described herein checks for OPC uniformity and robustness by using, for example, high-resolution images of multiple locations of multiple patterns. In some embodiments, for each of the imaged locations of a given pattern, the PCPC technique described herein compares the printed geometry against the OPC simulated geometry and the reference physical layout, and then, for example, the locations are grouped by common neighboring patterns. This allows, for example, a user to study the influence or effects of neighboring patterns, and to make any appropriate corrections to the OPC simulation model.

Figure 9:
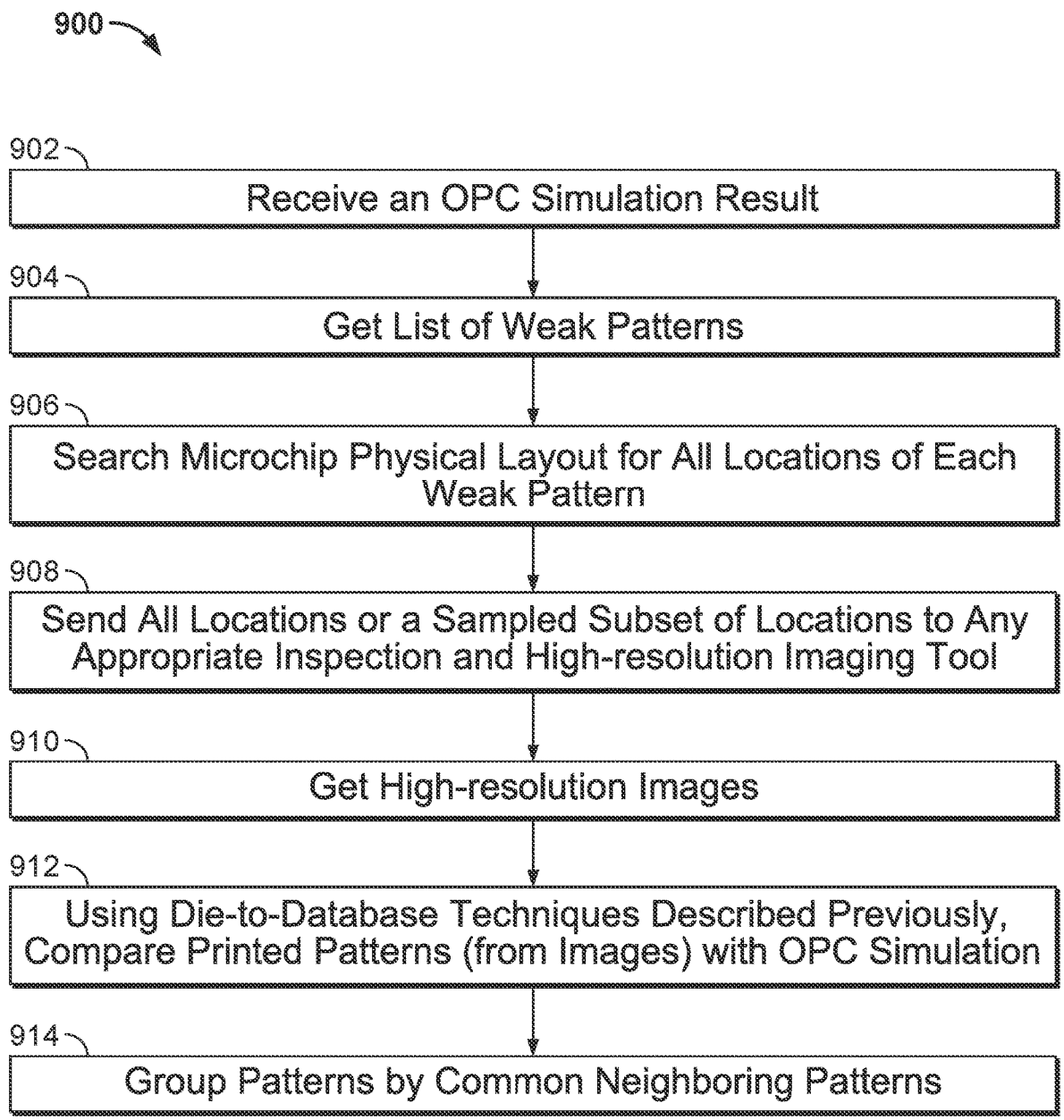
FIG. 9 illustrates an example embodiment of a process for checking OPC uniformity and robustness.

FIG. 9 illustrates an example embodiment of a process for checking OPC uniformity and robustness. In some embodiments, process 900 of FIG. 9 is executed by the Analytical and Output Engine 164 of system 150. The process begins at 902, when OPC simulation results are received. At 904, a list of weak patterns is extracted from the OPC simulation results received at 902. At 906, the (micro)chip physical layout is searched for all locations of each weak pattern (where there may be instances of the weak pattern at various places in the chip). In some embodiments, the search described at 906 may be accomplished by cross-referencing each OPC weak pattern against the patterns in the Pattern Decomposition and Ranking Database 163. As described previously, this database not only contains a list of unique constituent patterns, but also the physical locations of all repeat occurrences of each pattern. Therefore, performing the function of 906 provides the same result as a cross-reference operation and a look-up operation against the Pattern Decomposition and Ranking Database 163. Such cross-reference and look-op operations are orders of magnitude faster than performing brute-force searches of each OPC weak pattern across the full physical layout of the chip. At 908, all locations (or a sampled subset of locations) are sent to appropriate inspection and high-resolution imaging tools. At 910, high-resolution images are received or obtained in response. At 912, using die-to-database techniques such as those described in conjunction with FIG. 4, printed patterns (e.g., contours extracted from images obtained at 910) are compared with OPC simulation (e.g., simulated renditions of contours of patterns) and the reference physical layout. At 914, patterns are grouped by common neighboring patterns. This has the effect of confirming whether weak patterns predicted by OPC simulation are in fact weak, and also of providing information for determining whether neighboring patterns (and exactly which neighboring patterns) may be influencing the outcome.

Identify Missing Weak Patterns in OPC Simulation

Figure 10:
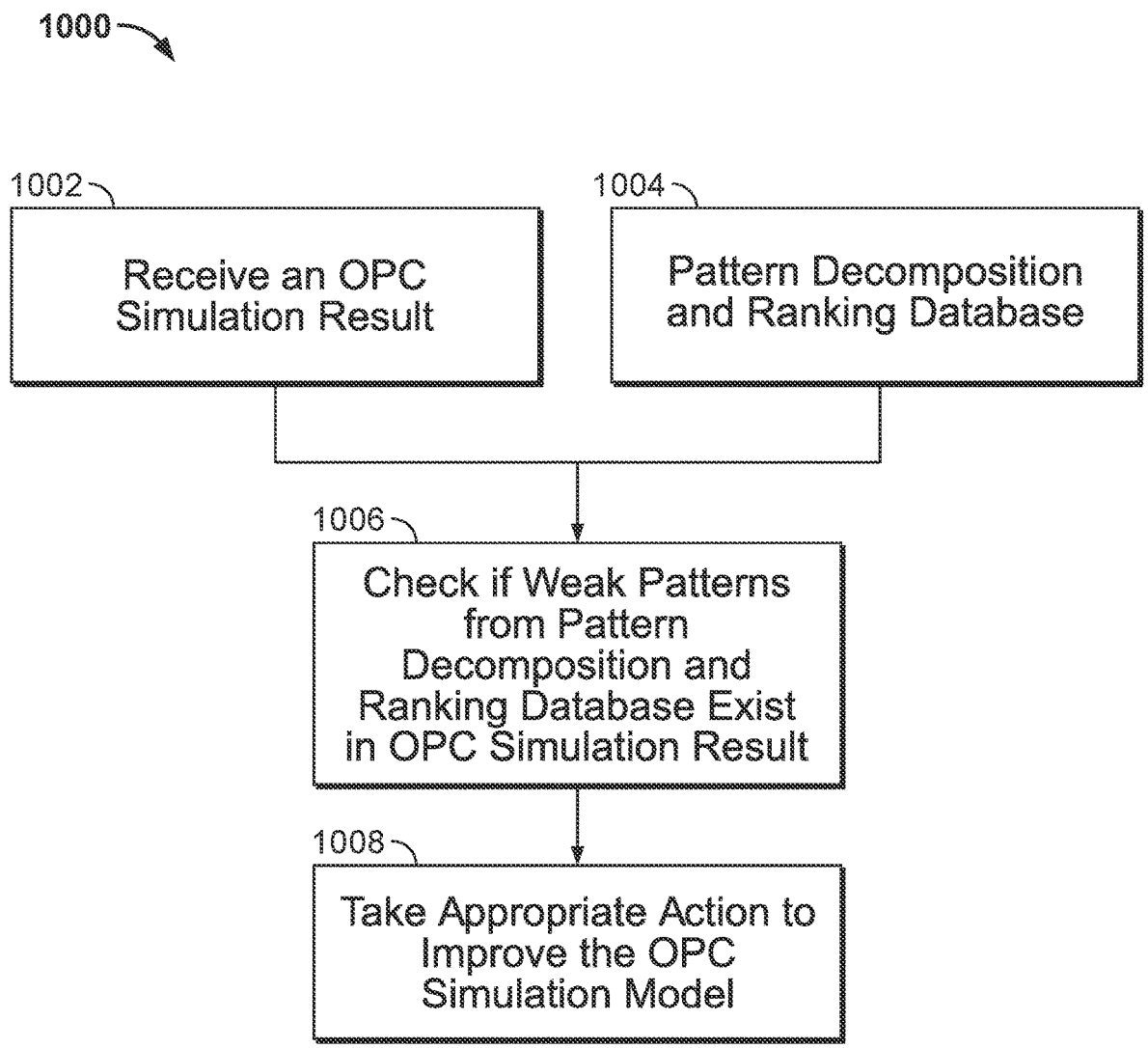
FIG. 10 illustrates an example embodiment of a process for identifying missing weak patterns in OPC simulation.

FIG. 10 illustrates an example embodiment of a process for identifying missing weak patterns in OPC simulation. Because OPC simulation may not be 100% accurate, it may be possible for OPC simulation to fail to identify some weak patterns. In some embodiments, by building the Pattern Decomposition and Ranking Database 163 and using empirical data for scoring patterns, as described previously, weak patterns from this database may be queried and compared against weak patterns from the OPC simulation to determine, for example, if OPC simulation failed to identify any of the actually-detected weak patterns. Appropriate corrective action may then be taken by the OPC team; for example, the OPC simulation model may be fine-tuned accordingly.

In some embodiments, process 1000 of FIG. 10 is executed by the Analytical and Output Engine 164 of system 150. The process begins at 1002 and 1004, when weak patterns are queried from the Pattern Decomposition and Ranking Database 163 on the basis of the empirical ranking scores, and OPC simulation results are received, respectively. At 1006, the actually-detected weak patterns from 1004 are compared against the OPC simulation result received at 1002 to determine if actually-detected weak patterns were properly predicted by the OPC simulation. At 1008, appropriate action is taken to make any needed corrections or modifications to the OPC simulation model.

Identify Process Window for Individual OPC Weak Patterns

In some embodiments, one of the standard preliminary steps in the manufacture of semiconductor wafers is an operation referred to as Process Window Qualification (PWQ). Typically, there may be hundreds of individual microchips—or die—printed on a wafer. In some embodiments, the printing process may be analogous to that of traditional film cameras, in which light is exposed onto the surface of photographic film that contains photosensitive material, and subsequently "developed" by applying chemicals that render the photosensitive material inert and permanent. In some embodiments, a good quality image may depend on both the focus plane and the exposure duration, where focus in film cameras is governed principally by the lens setting, and exposure in film cameras is governed principally by the shutter speed and aperture setting, which together determine the amount of light—or amount of exposure—that the film receives. It may be difficult to determine the optimum focus and exposure setting for a camera image, and the same may be true with the printing of semiconductor wafers. For example, in some embodiments, to find the optimum focus and exposure settings for a lithography tool, a PWQ wafer is created in which different groups of die are subjected to slightly different focus and exposure settings. This experimental wafer is then thoroughly inspected by a wafer inspection tool running, for example, a high-sensitivity inspection. In some embodiments, the focus and exposure settings for the set (or sets) of die containing the fewest defects (or containing no killer defects) are declared to be the best settings. These settings may be referred to as the "lithography process window," because they define, for example, the window of acceptable focus and exposure settings.

In some embodiments, the weak patterns identified by OPC simulation may behave differently in different focus and exposure settings. In some embodiments, using the PCPC technique described herein, a large-scale assessment may be performed of the behavior of these OPC weak patterns in each of the different focus and exposure settings to identify, for example, the best process window for each of these patterns.

Figure 11:
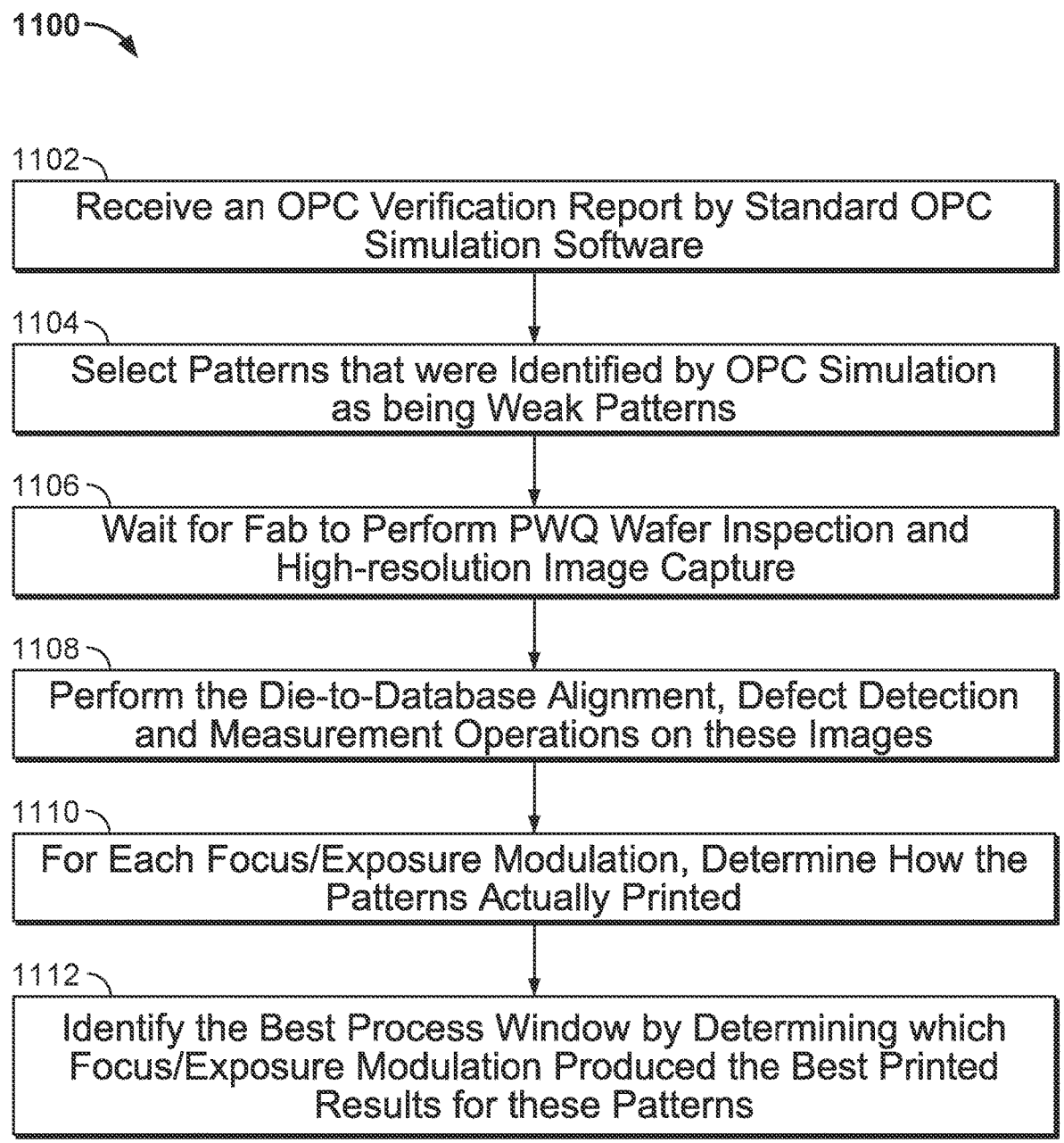
FIG. 11 illustrates an example embodiment of a process for identifying process windows for individual OPC weak patterns.

FIG. 11 illustrates an example embodiment of a process for identifying process windows for individual OPC weak patterns. In some embodiments, process 1100 of FIG. 11 is executed by the Analytical and Output Engine 164 of system 150. The process begins at 1102, when an OPC verification report is received (e.g., as a result of OPC simulation). At 1104, all patterns that were identified by OPC simulation to be weak patterns are selected. At 1106, PWQ wafer inspection and high-resolution image capture is performed. In some embodiments, the results of a PWQ inspection are exported to a file that identifies not only the coordinates of each defect, but also the focus and exposure settings that were applied to the die on which the defect was found. This allows defects to be tracked by focus and exposure variation. Each die that is printed with a focus and exposure variation is commonly referred to as a modulated die. And each focus and exposure variation is commonly referred to as a focus and exposure modulation. At 1108, die-to-database alignment, defect detection and measurement operations (e.g., as described at 404-412 of FIG. 4) are performed on the images taken at 1106. At 1110, for each focus/exposure modulation, it is determined how the patterns are actually printed. At 1112, the best process window is identified by determining which focus/exposure modulations produced the best printed results for each pattern, and which focus/exposure modulations produced the best printed results overall for all patterns.

Proactive Wafer-Less Ranking of a New Device

The Pattern Decomposition and Ranking Database 163 may also be used to provide an early or proactive assessment for patterns in a new semiconductor chip before that chip has been printed on a wafer. For example, suppose that the physical layout of a new semiconductor chip is received. The new chip's physical layout may be decomposed using the layout decomposition techniques described previously. The decomposed patterns of the new chip may then be cross-referenced with the ranked decomposed patterns of one or more previous chips in the Pattern Decomposition and Ranking Database to find matching or similar constituent patterns. For those similar or matching patterns in the new design, the ranking information from the previous design(s) can be assigned to those identified similar or matching patterns, and used to provide a preliminary yield assessment of the new chip design. This allows for early or proactive yield estimation to be performed for the new device. In another embodiment, machine learning models built using information collected from existing designs can be applied to the new patterns (e.g., not currently in the Pattern Decomposition and Ranking Database) of the new design, in order to provide those new novel patterns with a predicted risk assessment. This allows for even more patterns of the new device to be assessed, leading to an improved yield estimation for the new device.

Figure 12:
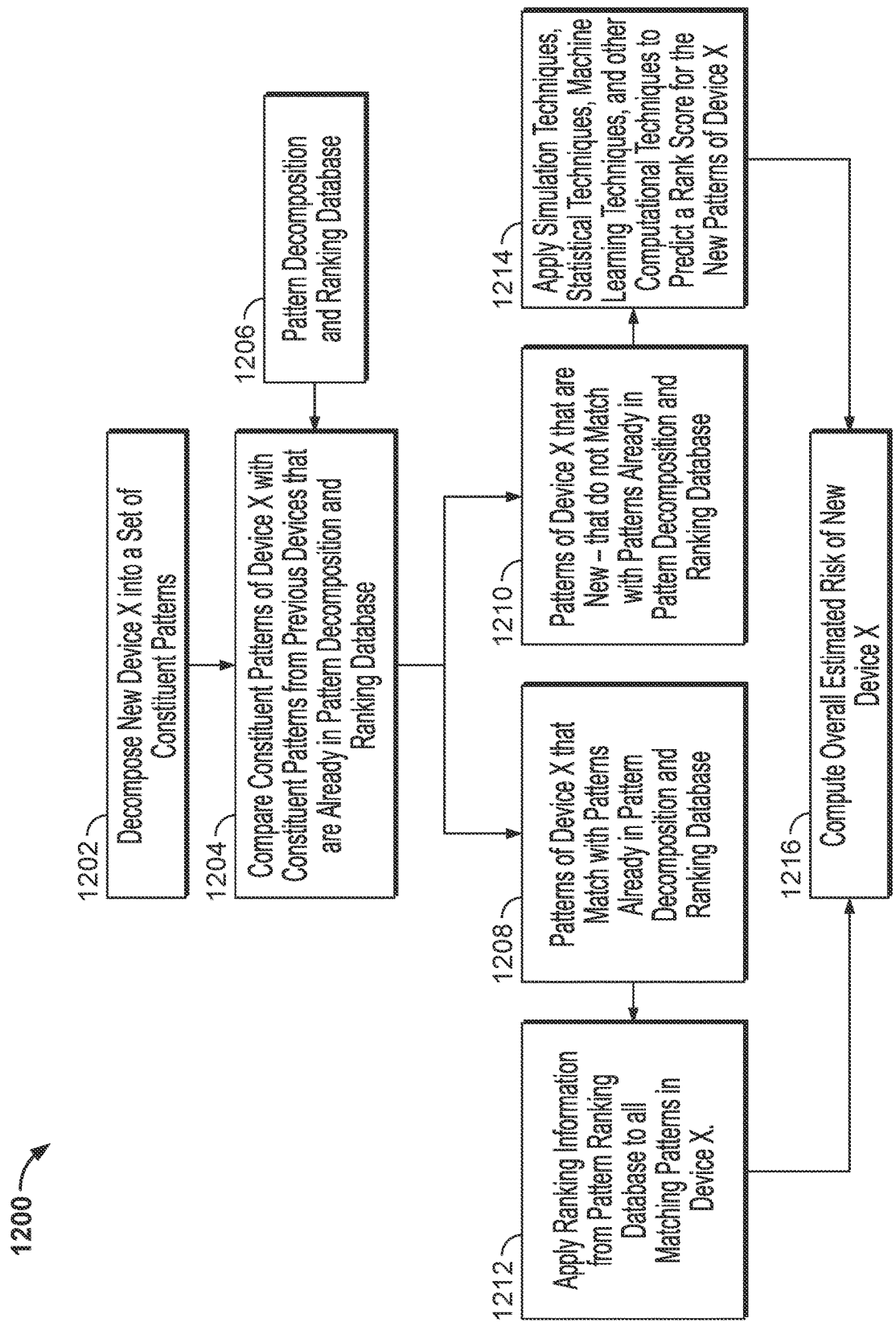
FIG. 12 illustrates an example embodiment of a process for proactively assessing the manufacturing or yield risk factor for a new device.

FIG. 12 illustrates an example embodiment of a process for performing a proactive risk assessment of the constituent patterns of a new device and calculating an overall yield prediction or yield estimation value for the new device. In some embodiments, process 1200 of FIG. 12 is executed by the Analytical and Output Engine 164 of system 150. The process begins at 1202, where the physical layout of a new device, also referred to as a New Tape Out or NTO, is first decomposed into a set of unique constituent patterns by applying, for example, the decomposition rules and techniques used to create the Pattern Decomposition and Ranking Database 163. At 1204, the unique constituent patterns of the new device are compared or cross-referenced with the patterns that already exist in the Pattern Decomposition and Ranking Database 163. Patterns of the new device that match to patterns already present in the Pattern Decomposition and Ranking Database are assigned a risk or ranking score at 1212, where the risk or ranking scores are taken directly from the Pattern Decomposition and Ranking Database. Patterns of the new device at 1210 that do not match any preexisting patterns in the Pattern Decomposition and Ranking Database may, in some embodiments, be assigned a predicted risk or ranking score at 1214 using any combination of simulation, statistical, machine learning, and other computational techniques such as those described above. Subsequently, all of the risk or ranking scores assigned in the manner of 1212 and 1214 are used to compute an overall estimated risk factor for the new device at 1216.

Summary

Thus, using the PCPC technique described herein, a complete ranking table for the set of unique constituent patterns of devices may be constructed. This allows, for example, even better judgements to be made about which of these patterns are most and least likely to be problematic. In various embodiments, the fab's process control and yield enhancement initiatives may then be directed more meaningfully, the patterns of a new microchip device that has yet to be fabricated may be proactively judged, the impact of any changes made to the various fabrication and mask processes may be assessed, process drift may be monitored, and the database may be opened to a myriad of other applications that a fab may develop.

Figure 13:
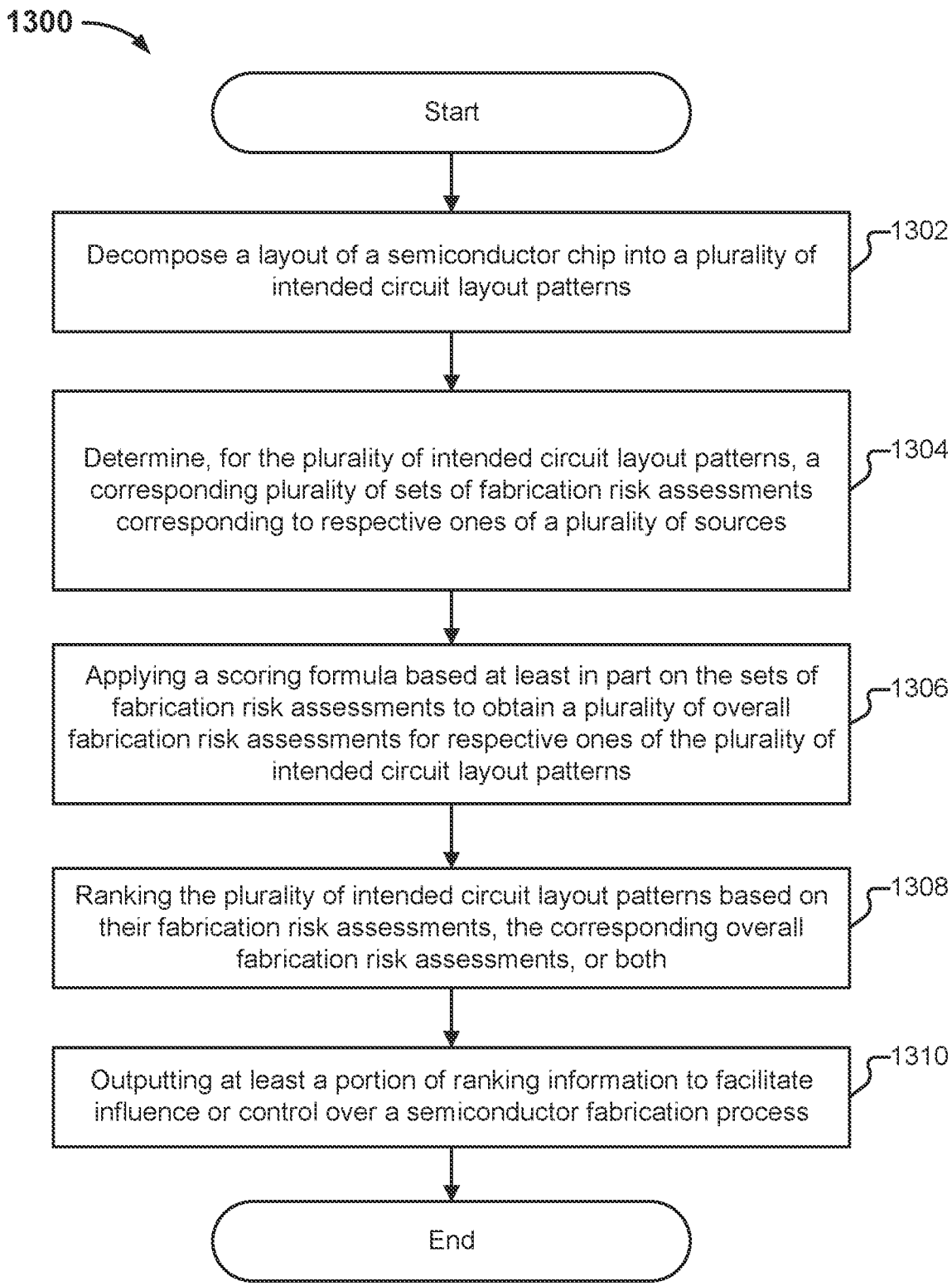
FIG. 13 is a flow diagram illustrating an embodiment of a process for pattern centric process control.

FIG. 13 is a flow diagram illustrating an embodiment of a process for pattern centric process control. In some embodiments, process 1300 is executed by platform 150 of FIG. 1B. The process begins at 1302, when a layout of a semiconductor chip is decomposed into intended circuit layout patterns (unique constituent patterns).

At 1304, for the intended circuit layout patterns, corresponding sets of fabrication risk assessments corresponding to respective ones of a set of sources are determined. In some embodiments, determining a set of fabrication risk assessments for an intended circuit layout pattern includes determining fabrication risk assessments based on sources including simulation of the intended circuit layout pattern, statistical analysis of the intended circuit layout pattern, and/or evaluation of empirical data associated with one or more printed circuit layout patterns (which may or may not correspond directly to the intended circuit layout pattern). Thus, in some embodiments, each source provides a prediction of the likelihood that printing of the pattern will fail. Thus, a single pattern will have multiple individual source scores, with each distinct score being a prediction from a particular source of the likelihood that printing of the pattern will fail. As one example, a single decomposed pattern may have an empirical data-based score (e.g., based on actual printed wafers), a simulation-based score (e.g., OPC simulation-based), and a statistical analysis-based score (e.g., design signature-based).

In some embodiments, a fabrication risk assessment is a prediction or likelihood that the pattern will not print properly (e.g., a prediction of the defective rate for the pattern). As one example, the fabrication risk assessment is a score, on a scale of 0-100, indicating or predicting the likelihood that the pattern will fail to print properly (e.g., that a pattern has a 5% failure rate when printed). For example, a zero indicates that there is zero percent likelihood of failure, while one hundred indicates that there is a one hundred percent likelihood of failure for the pattern.

Other scales or other forms of fabrication risk assessments may be used. For example, a scale of Low (L) risk of failure, Medium (M) risk of failure, or High (H) risk of failure may be determined and assigned to a pattern. In some embodiments, different types of sources may have different corresponding types or forms of fabrication risk assessments.

In some embodiments, the predicted likelihood of failure is determined, in part, based on the number of times a defect was observed, by a given predictive or empirical source, for the pattern. For example, when using the 0-100 scale, the likelihood of failure may be determined by dividing the detected number of defects by the total number of instances of the pattern in the layout. In some embodiments, in addition to the score, the raw number of defects detected is also recorded. By keeping the raw data, various types of statistics may be computed and presented to users. For example, at the beginning of a process development cycle or the beginning of the fabrication cycle for a device, there may be more numerous defects. During this period, the frequency or ratios or percentages of failure for patterns may be more useful in prioritizing which patterns to focus on (e.g., when many patterns are having defects, it would be beneficial to first focus on or address those patterns that are having the highest frequency of defects). As the process matures, fewer defects may be observed, so a different metric may be used to select or prioritize the patterns that need more immediate attention.

As another example of scoring information recorded for a pattern, a flag may be recorded indicating that at least one defect was detected for a decomposed pattern in the Pattern Decomposition and Ranking Database 163. For example, while the percentage of failure may be significant, the fact that printing of the pattern resulted in even one failure may also be significant. As one example, if the pattern is around a critical feature, where there is a short between two lines, then the chip will be non-functional.

The individual fabrication risk assessments determined from each ranking source are then assigned to patterns in the Pattern Decomposition and Ranking Database 163. For example, the individual, per-source risk assessments are added as an entry for the record for the intended circuit layout pattern in the Pattern Decomposition and Ranking Database 163 of system 150. In some embodiments, each row of the Pattern Decomposition and Ranking Database corresponds to a unique intended circuit layout pattern. Each source of information used to determine fabrication risk assessments has a corresponding column in the database table. Other data structures may be used to implement the Pattern Decomposition and Ranking Database 163.

In some embodiments, each ranking source is associated with a corresponding reliability and a corresponding coverage. The corresponding reliability indicates accuracy of the fabrication risk assessment determined by information from the source. The corresponding coverage indicates what percentage of the constituent patterns (or intended circuit layout patterns) for a device can reasonably be expected to be assigned a risk or ranking score from the particular source. Each source may therefore be ranked according to the corresponding reliabilities and/or coverages. For example, the reliabilities and coverages may be used to weight the individual fabrication risk assessments for the sources when generating an overall fabrication risk assessment for an intended circuit layout pattern.

One example of ranking an intended circuit layout pattern based on statistical analysis is determining and analyzing geometric design signatures for the intended circuit layout pattern. For example, a set of design signatures is generated for the intended circuit layout pattern. In various embodiments, the set of design signatures generated for the intended circuit layout pattern includes statistical summaries of pattern complexity, pattern directionality (e.g., are lines predominantly in the horizontal or vertical direction), pattern density, pattern homogeneity, etc. The set of design signatures are generated directly from the physical layout of the semiconductor chip.

A fabrication risk assessment for the intended circuit layout pattern is determined based on the generated set of design signatures. The fabrication risk assessment determined based on the generated set of design signatures is assigned to the intended circuit layout pattern (e.g., added as an entry for the record for the intended circuit layout pattern in the Pattern Decomposition and Ranking Database 163 of system 150).

One example of ranking an intended circuit layout pattern based on simulation techniques includes performing optical proximity correction (OPC) simulation. For example, OPC simulation is performed on the intended circuit layout pattern (this may include the application of OPC decorations, which are small modifications made to the pattern that improve the ability of the pattern to be printed correctly). A fabrication risk assessment for the intended circuit layout pattern is determined based on the results of the OPC simulation performed on the intended circuit layout pattern (which may include OPC decorations). The fabrication risk assessment determined based on the results of the OPC simulation performed on the intended circuit layout pattern is assigned to the intended circuit layout pattern (e.g., added as an entry for the record for the intended circuit layout pattern in the Pattern Decomposition and Ranking Database 163 of system 150).

Another example of simulation-based ranking of the intended circuit layout pattern is to perform OPC simulation on the entire physical layout of the semiconductor chip. Fabrication risk assessments for the intended circuit layout patterns extracted from the layout decomposition performed at 1302 are determined by cross-referencing the OPC verification report that is generated from the OPC simulation performed on the entire layout of the semiconductor chip.

One example of ranking an intended circuit layout pattern based on empirical data of printed circuit layout patterns includes using measurement information obtained from actual wafers in the fab.

For example, empirical data associated with a printed circuit layout pattern is obtained. The empirical data may be extracted from images such as high resolution images (e.g., scanning electron microscope (SEM) images or eBeam images) and from defectivity data from lower resolution (but faster) inspection tools such as optical inspection tools (or other wafer inspection tools such as laser scatter inspection tools).

In some embodiments, it is determined that the printed circuit layout pattern corresponds to the intended circuit layout pattern. For example, suppose that an SEM image of a portion of printed wafer is obtained. Contour extraction and alignment, as described previously, may be performed. Further, defect detection and measurement may also be performed to determine deviations between the intended circuit layout pattern and the corresponding printed circuit layout pattern.

A fabrication risk assessment is determined for the intended circuit layout pattern based on the empirical data associated with the printed circuit layout pattern. The fabrication risk assessment determined based on the empirical data associated with the printed circuit layout pattern is assigned to the intended circuit layout pattern (e.g., added as an entry for the record for the intended circuit layout pattern in the Pattern Decomposition and Ranking Database 163 of system 150).

In some cases, empirical data directly corresponding to the intended circuit layout pattern may not be available (or not yet obtained). The coverage of empirical data-based ranking sources may be improved as follows. Fabrication risk assessment for the intended circuit layout patterns that are currently missing empirical data based ranking information can be determined by developing a risk assessment prediction model from the empirical data that already exists for other patterns in the Pattern Decomposition and Ranking Database. The fabrication risk assessment predicted through the use of a model built from empirical data for other intended circuit layout patterns is then assigned to the intended circuit layout pattern (that does not have direct empirical data).

In various embodiments, the predicting is performed using machine learning (e.g., support vector machines (SVM), K-nearest neighbor, convolutional neural networks, deep learning networks, etc.).

One example of predicting based on SVM is as follows. For the intended circuit layout pattern that does not have direct empirical data (i.e., a pattern with an unassigned empirical score) from corresponding printed circuit layout patterns, a corresponding feature vector is derived. The derived feature vector is compared with clusters of feature vectors for known good patterns and clusters of feature vectors for known bad patterns to determine whether the derived feature vector for the pattern with an unassigned empirical score is included in the clusters of good-pattern feature vectors or the clusters of bad-pattern feature vectors.

One example of generating the clusters of good-pattern and bad-pattern feature vectors is as follows. A set of known good intended circuit layout patterns and a set of known bad intended circuit layout patterns obtained from empirical data for printed circuit layout patterns are accessed.

Starting with an initial set of feature parameters, the clusters of good-pattern feature vectors are generated from the set of known good intended circuit layout patterns, and the clusters of bad-pattern feature vectors are generated from the set of known bad intended circuit layout patterns. As one example, the feature vectors for the intended circuit layout patterns are based on the design signatures and OPC simulation ranking of the intended circuit layout patterns.

An amount of overlap is determined between the clusters of good-pattern feature vectors and the clusters of bad-pattern feature vectors. If the determined amount of overlap exceeds a threshold that is necessary for statistical confidence, then the two sets of clusters are deemed unable to properly distinguish good patterns from bad patterns, and therefore the set of feature parameters (e.g., initial set of feature parameters) is adjusted, and the clusters of good-pattern feature vectors and the clusters of bad-pattern feature vectors are iteratively regenerated based on the adjusted set of feature parameters. The clusters may further be dynamically or iteratively regenerated as additional empirical data (e.g., obtained from analysis of additional SEM images) is obtained. If the clusters of good-pattern feature vectors are sufficiently disjointed (minimal to no overlap) from the clusters of bad-pattern feature vectors (in N-dimensional feature vector space), then a viable prediction model is deemed to have been built. If, however, the clusters of good-pattern feature vectors overlap appreciably with the clusters of bad-pattern feature vectors (even after the iterative regeneration of feature vectors has taken place), then it is concluded that a viable prediction model cannot be established on the basis of the specified feature parameters. In this case, the machine learning algorithm returns a suitable error or warning.

At 1306, a scoring formula based on the sets of fabrication risk assessments is applied to obtain overall fabrication risk assessments for respective ones of the intended circuit layout patterns into which the layout of the semiconductor chip was decomposed. Examples of scoring formulas include formulas which aggregate, or rollup the individual fabrication risk assessments computed for the various ranking sources at 1304.

At 1308, the intended circuit layout patterns are ranked based on their discrete fabrication risk assessments (e.g., determined at 1304) and/or the corresponding overall fabrication risk assessments (e.g., determined at 1306).

At 1310, the ranking information determined at 1308 is outputted to facilitate influence or control over a semiconductor fabrication process.

As one example, the ranking information is outputted to be displayed. For example, via a graphical user interface, users may query the rankings of the Pattern Decomposition and Ranking Database 163 of system 150 to perform data mining.

One example type of query is to look for trends in the printability of patterns. For example, in various embodiments, a user may query the Pattern Decomposition and Ranking Database 163 for worsening patterns, improving patterns, and stable patterns. The user may also search for trends in patterns matching specific search rules, such as the trend of all patterns with certain features (e.g., certain line widths, certain types of patterns/feature (e.g., tip-to-tip), etc.).

Another example type of query is for the best, worst, and/or most stable patterns. For example, in various embodiments, the user may query the Pattern Decomposition and Ranking Database 163 for the best patterns, worst patterns, most stable patterns, least stable patterns, most stable good patterns, least stable good patterns, most stable bad patterns, and the least stable bad patterns.

Another example type of query is to perform comparison/splitting of patterns. For example, the Pattern Decomposition and Ranking Database may be queried to perform device to device comparison (i.e., device split), lot to lot comparison (i.e., lot split), and date-range to date-range comparison (e.g., for process/mask revision impact—date split). For example, the information recorded for the intended circuit layout patterns (e.g., obtained from various sources) may have corresponding metadata such as device identifier information, lot identifier information, and date information, which may be used as dimensions to segment the data in the Pattern Decomposition and Ranking Database 163 when performing a query. Thus, for example, the printability trends may be compared between two or more devices, two or more lots, two or more date ranges, etc. by examining, displaying, and analyzing the trends in each segment.

As another example, the ranking information is outputted to design verification tools, metrology tools, inspection tools, and imaging tools.

As another example, the ranking information is used to perform in-wafer OPC verification. For example, as described above, empirical data obtained for printed circuit layout patterns can be used to validate the performance of OPC simulation (by comparing the printed circuit layout patterns to the simulation results of corresponding intended circuit layout patterns in the Pattern Decomposition and Ranking Database 163 of system 150). Based on the comparison, OPC models used in the simulation may be adjusted to improve the performance and accuracy of OPC simulation.

As another example, the determined ranking information may be used to perform a yield estimation for a new semiconductor chip. As one example, suppose that a new semiconductor chip has been designed. Layout decomposition of the new semiconductor chip may be performed (e.g., using the process described at 1302). The intended circuit layout patterns for the new semiconductor chip may then be cross-referenced with the intended circuit layout patterns of any previous semiconductor chip whose data already exists in the Pattern Decomposition and Ranking Database. For those intended circuit layout patterns in the new semiconductor chip that are already present in the previous semiconductor chip(s), the fabrication risk assessments for the intended circuit layout patterns of the previous semiconductor chip are extracted from the Pattern Decomposition and Ranking Database and assigned to the matching intended circuit layout patterns in the new semiconductor chip. This establishes a preliminary understanding of the fabrication risk of the new semiconductor chip using historical information.

As another example, the determined ranking information may be used to facilitate mask revisions and inform design changes, such as changes to OPC decoration. The impact of those revisions may then be tracked in the Pattern Decomposition and Ranking Database and queried (e.g., to allow a user to query for the rankings of patterns prior to and after the revisions).

As described above, a Pattern Decomposition and Ranking Database is built. (In some embodiments a real silicon pattern quality database is also built). Using the PCPC techniques described herein, a comprehensive correlation between the physical layout (design intent) and wafer patterning reality is established. Further, the fabrication risk of intended circuit layout patterns of a full chip physical layout is proactively assessed (or ranked or scored) and continuously updated based on actual patterning history (empirical printed pattern data), as well as on correlation with other sources of information such as OPC simulation, and design signatures. Further, die-to-database (D2DB) defect detection and metrology may also be performed to provide the ranking of the patterns of interest based on actual wafer images. By using the PCPC techniques described herein, such as by establishing a ranked Pattern Decomposition and Ranking Database, various applications may be realized or facilitated, such as providing more effective care area generation and review sample planning, as described above. As another example, in-wafer OPC verification and all-module hotspot prevention may also be performed. Thus, using the techniques described herein, and using a platform such as system 150, design and real silicon are combined to provide an integrated platform for patterning control (facilitating printing of semiconductor patterns).

The PCPC technique described herein provides various benefits in patterning control (e.g., in monitoring the fabrication process), such as maximizing the use of existing fab tools, maximizing the use of existing data (e.g., existing SEM images, existing OPC simulation results, etc.), etc. Further, the need for manual interaction and analysis is minimized, which would otherwise be an impractically tedious and time-consuming task.

Thus, using the process centric process control techniques described herein, a Pattern Decomposition and Ranking Database is built by decomposing a layout of a semiconductor chip. The decomposed or intended circuit layout patterns generated by the decomposition and recorded in the Pattern Decomposition and Ranking Database are scored or ranked using information from various ranking sources. Coverage deficiencies in the various scoring sources may also be addressed, for example, using machine learning, as described above. The scored or ranked patterns in the Pattern Decomposition and Ranking Database may then be used in various ways to influence or facilitate improved control of semiconductor fabrication processes. Further, the pattern centric process control system described herein is vendor neutral and off-tool, allowing for centralized, open databases, where pre-defined workflows may be used, or custom workflows created (i.e., customers using the services provided by system 150 may optimize and tailor the pattern centric process control process for their needs).

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
assigning, to a plurality of intended circuit layout patterns in a layout of a semiconductor chip, a plurality of sets of fabrication risk assessments, wherein the fabrication risk assessments in each set of fabrication risk assessments of the plurality of sets of fabrication risk assessments correspond to respective intended circuit layout patterns of the plurality of intended circuit layout patterns, the assigning comprising:
   determining a first set of fabrication risk assessments based on statistical analysis of the plurality of intended circuit layout patterns; and
   determining a second set of fabrication risk assessments based either on simulation of respective intended circuit layout patterns of the plurality of intended circuit layout patterns or on evaluation of empirical data for respective printed circuit layout patterns associated with respective intended circuit layout patterns of the plurality of intended circuit layout patterns;
ranking the plurality of intended circuit layout patterns based on their respective fabrication risk assessments in the plurality of sets of fabrication risk assessments; and
outputting information regarding the ranking.

2. The method of claim 1, wherein the statistical analysis comprises analysis of one or more of pattern complexity, pattern directionality, pattern density, or pattern homogeneity for the plurality of intended circuit layout patterns.

3. The method of claim 1, further comprising decomposing the layout of the semiconductor chip into the plurality of intended circuit layout patterns based on geometric rules.

4. The method of claim 1, wherein ranking the plurality of intended circuit layout patterns comprises:
generating overall fabrication risk assessments for respective intended circuit layout patterns of the plurality of intended circuit layout patterns, using the plurality of sets of fabrication risk assessments; and
ranking the plurality of intended circuit layout patterns using the respective overall fabrication risk assessments.

5. The method of claim 4, wherein:
each set of the plurality of sets of fabrication risk assessments is associated with a respective source having a reliability and a coverage;
a first source associated with the first set of fabrication risk assessments is the statistical analysis;
a second source associated with the second set of fabrication risk assessments is either the simulation or the evaluation of empirical data; and
generating the overall fabrication risk assessments comprises weighting the fabrication risk assessments in each set by the reliability and the coverage of the respective source.

6. The method of claim 1, wherein:
the second set of fabrication risk assessments is determined based on the simulation of respective intended circuit layout patterns of the plurality of intended circuit layout patterns; and
the simulation comprises optical proximity correction (OPC) simulation.

7. The method of claim 6, wherein the assigning further comprises determining a third set of fabrication risk assessments based on the evaluation of empirical data for respective printed circuit layout patterns associated with respective intended circuit layout patterns of the plurality of intended circuit layout patterns.

8. The method of claim 7, wherein the empirical data comprises scanning electron microscope (SEM) inspection data for the semiconductor chip.

9. The method of claim 7, wherein the empirical data comprises optical inspection data for the semiconductor chip.

10. The method of claim 7, wherein the third set does not have a fabrication risk assessment for a particular intended circuit layout pattern of the plurality of intended circuit layout patterns, the method further comprising:
predicting a fabrication risk assessment for the particular intended circuit layout pattern using fabrication risk assessments in the third set for a subset of the plurality of intended circuit layout patterns; and
including the predicted fabrication risk assessment in the third set in association with the particular intended circuit layout pattern.

11. The method of claim 10, wherein the predicting is performed using machine learning.

12. The method of claim 7, further comprising:
performing the OPC simulation using an OPC model;
comparing results of the OPC simulation to the fabrication risk assessments in the third set to determine an accuracy of the OPC simulation; and
based on the comparing, adjusting the OPC model to improve the accuracy.

13. The method of claim 1, wherein:
the plurality of sets of fabrication risk assessments are stored in association with the plurality of intended circuit layout patterns in a database; and
the information regarding the ranking is outputted in response to querying of the database.

14. The method of claim 1, wherein outputting the information regarding the ranking comprises providing the information for display.

15. The method of claim 1, wherein outputting the information regarding the ranking comprises providing the information to a design verification tool, a metrology tool, an inspection tool, or an imaging tool.

16. A non-transitory computer-readable storage medium storing software for execution by one or more processors, the software comprising instructions for:
assigning, to a plurality of intended circuit layout patterns in a layout of a semiconductor chip, a plurality of sets of fabrication risk assessments, wherein the fabrication risk assessments in each set of fabrication risk assessments of the plurality of sets of fabrication risk assessments correspond to respective intended circuit layout patterns of the plurality of intended circuit layout patterns, the assigning comprising:
   determining a first set of fabrication risk assessments based on statistical analysis of the plurality of intended circuit layout patterns; and
   determining a second set of fabrication risk assessments based either on simulation of respective intended circuit layout patterns of the plurality of intended circuit layout patterns or on evaluation of empirical data for respective printed circuit layout patterns associated with respective intended circuit layout patterns of the plurality of intended circuit layout patterns;

ranking the plurality of intended circuit layout patterns based on their respective fabrication risk assessments in the plurality of sets of fabrication risk assessments; and outputting information regarding the ranking.

17. A system, comprising:

one or more processors; and a non-volatile storage medium storing software for execution by the one or more processors, the software comprising instructions for:

assigning, to a plurality of intended circuit layout patterns in a layout of a semiconductor chip, a plurality of sets of fabrication risk assessments, wherein the fabrication risk assessments in each set of fabrication risk assessments of the plurality of sets of fabrication risk assessments correspond to respective intended circuit layout patterns of the plurality of intended circuit layout patterns, the assigning comprising:

determining a first set of fabrication risk assessments based on statistical analysis of the plurality of intended circuit layout patterns; and determining a second set of fabrication risk assessments based either on simulation of respective intended circuit layout patterns of the plurality of intended circuit layout patterns or on evaluation of empirical data for respective printed circuit layout patterns associated with respective intended circuit layout patterns of the plurality of intended circuit layout patterns;

ranking the plurality of intended circuit layout patterns based on their respective fabrication risk assessments in the plurality of sets of fabrication risk assessments; and outputting information regarding the ranking.

* * * * *